US007191951B2

(12) United States Patent
Hanyu et al.

(10) Patent No.: US 7,191,951 B2

(45) Date of Patent: Mar. 20, 2007

(54) PRICE INDICATION LABEL AND METHOD OF USING THE SAME

(75) Inventors: Mitsutaka Hanyu, Bad Soden (DE); Ryota Suzuki, Colchester Essex (GB)

(73) Assignee: Kabushiki Kaisha Sato, Tokyo (JP)

( * ) Notice: Subject to any disclaimer, the term of this patent is extended or adjusted under 35 U.S.C. 154(b) by 173 days.

(21) Appl. No.: 10/606,266

(22) Filed: Jun. 25, 2003

(65) Prior Publication Data

US 2004/0050941 A1 Mar. 18, 2004

(30) Foreign Application Priority Data

Jun. 26, 2002 (JP) ............................ 2002-185406
Jun. 26, 2002 (JP) ............................ 2002-186703

(51) Int. Cl.
*G06K 7/10* (2006.01)

(52) U.S. Cl. ...................... 235/486; 235/383; 235/375; 235/489

(58) Field of Classification Search ................ 235/468, 235/375, 378, 381, 383, 385; 705/20, 400, 705/415, 402–404, 408–409; 283/81, 94, 283/114, 101–106, 56, 117, 74
See application file for complete search history.

(56) References Cited

U.S. PATENT DOCUMENTS 3,628,266 A * 12/1971 Wise et al. .............. 40/654.01
3,946,507 A * 3/1976 Fergg et al. .................. 40/638
4,109,047 A * 8/1978 Fredrickson ................ 503/205
5,218,192 A * 6/1993 Fujii et al. .................. 235/487
5,344,191 A * 9/1994 Chang et al. ................. 283/72
5,458,307 A * 10/1995 Gebka ...................... 248/205.3
5,618,063 A * 4/1997 Chang et al. ................. 283/67
5,640,447 A * 6/1997 Fonseca ................. 379/114.18
5,810,397 A * 9/1998 Mehta et al. ............... 283/114
5,930,206 A * 7/1999 Haas et al. ................. 368/327
5,933,813 A * 8/1999 Teicher et al. ................ 705/26
5,943,654 A * 8/1999 Goodwin et al. ............. 705/14
5,978,772 A * 11/1999 Mold .......................... 705/16
5,984,363 A * 11/1999 Dotson et al. ................ 283/61
6,015,589 A * 1/2000 Mehta et al. ............... 427/152
6,126,125 A * 10/2000 Dalton .................... 248/205.2
6,129,796 A * 10/2000 Steinberg et al. ............. 156/64
6,217,966 B1 * 4/2001 Finster et al. .............. 428/42.1
6,258,746 B1 * 7/2001 Mehta et al. ............... 503/204
6,283,377 B1 * 9/2001 Takuma ...................... 235/492
6,568,111 B2 * 5/2003 Forsythe et al. .............. 40/657
6,581,828 B1 * 6/2003 Forsythe et al. ............ 235/383
6,621,407 B1 * 9/2003 Goodwin, III ............ 340/5.91

(Continued)

FOREIGN PATENT DOCUMENTS

EP 0 101 311 2/1984

(Continued)

*Primary Examiner*—Kimberly D. Nguyen
(74) *Attorney, Agent, or Firm*—Flynn, Thiel, Boutell & Tanis, P.C.

(57) ABSTRACT

The present invention relates to a price indication label comprising an detachable label body which has a price indication region capable of indicating a current price in an advertisement region capable of advertising information for sales promotion. In order to improve such price indication labels, the surface material of the price indication region and the surface material of the advertisement region are different from each other.

19 Claims, 12 Drawing Sheets

U.S. PATENT DOCUMENTS 6,742,294 B1 * 6/2004 Fossum .................... 40/611.1

FOREIGN PATENT DOCUMENTS

| | | | | |
|---|---|---|---|---|
| EP | 0 623 909 | | | 11/1994 |
| JP | 407160200 | A | * | 6/1995 |
| JP | 02000353224 | A | * | 12/2000 |
| JP | 2001-154584 | | | 6/2001 |
| WO | 98/33655 | | | 8/1998 |

* cited by examiner

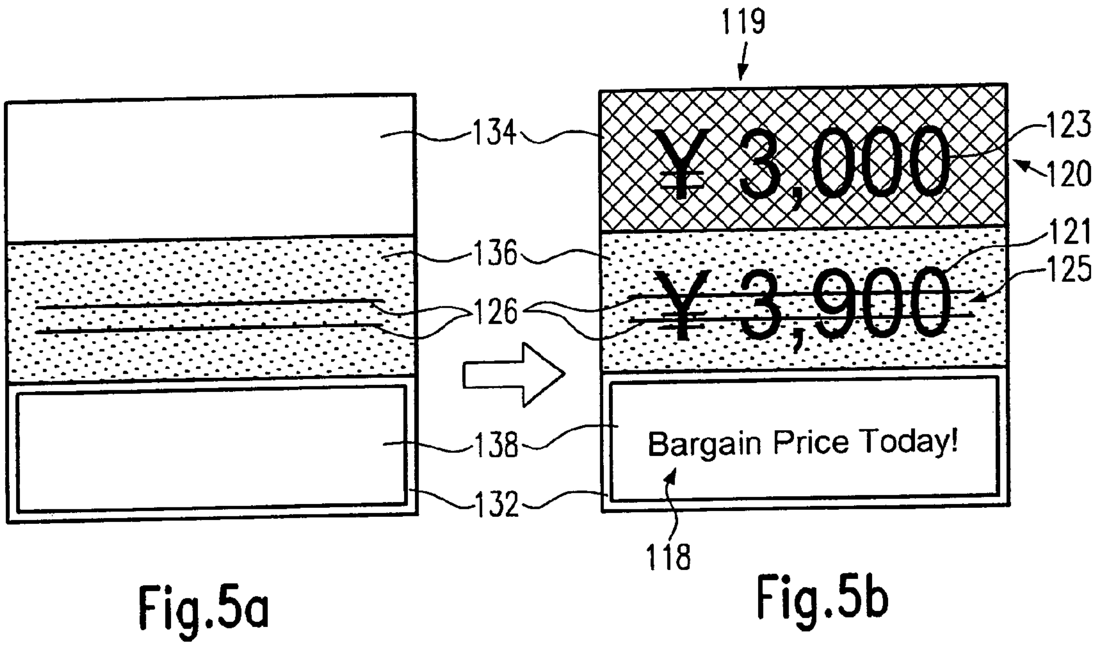
Fig.5a
Fig.5b
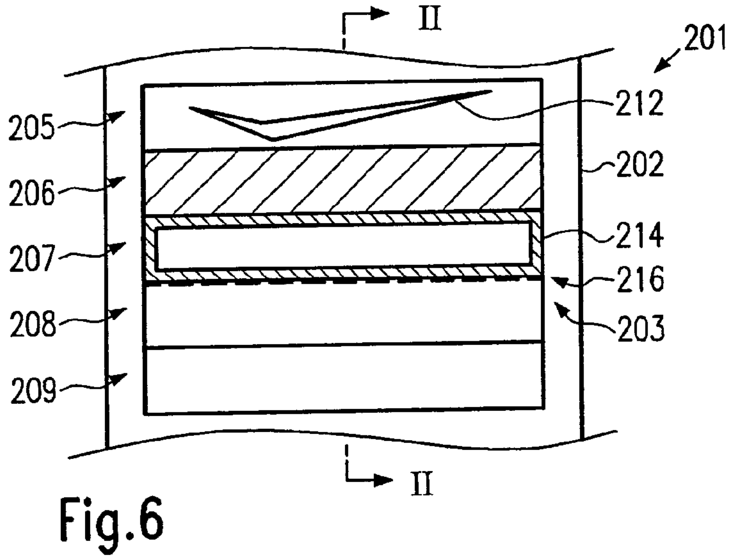
Fig.6
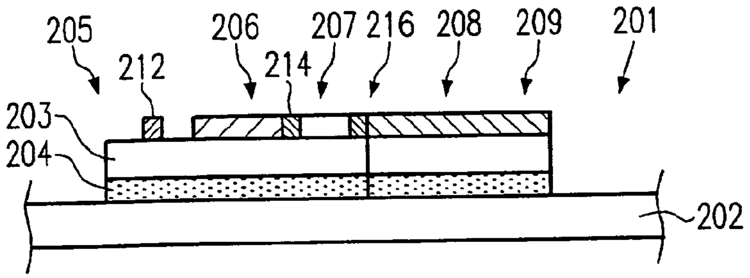
Fig.7

PRICE INDICATION LABEL AND METHOD OF USING THE SAME

FIELD OF THE INVENTION

The present invention relates to a price indication label having a price indication region.

BACKGROUND OF THE INVENTION

In retail stores and business such as supermarkets, department stores and the like, an information such as name, size, item number and price relating to a commodity or the like is printed on a commodity label or a commodity tag by using printers, and then the printed label is affixed directly to the commodity or the commodity tag and the printed tag is hang on it.

However, in a sale-strengthening month, there is a requirement that a commodity price is reduced temporarily or permanently as compared to a former original price in order to do a promotional sale for a commodity.

In such a case, the label on which the reduced price is printed and then affixed on the usual price indication surface of a commodity label or tag, and "100 yen reduction in price", "10% discount" and the like are written directly to a commodity label or commodity tag by felt pens. For example, according to a Japanese patent publication laid open No. 2001-154584, "a present sales price after a discount" and "unit price based on a predetermined price after a discount" are printed on a label. In addition, "Economical commodity", "Great deal", "Recommended articles of today" and the like are printed on shelf bills or POP (Point of Sales) advertising cards, and they may be used as sales promotion campaigns.

It is an object of the present invention to provide a price indication label for sales promotion having features not only of arranging suitability as a label for promoting the reduced price products but also of making effectively use by a cash register for checking the present price easier and, moreover, enabling to print easily by using conventional printers without increasing cost.

Moreover it is an object of the invention to provide a sales promotion label for use on tag can enhance merchandise sales promotion.

Furthermore it is an object of the invention to provide a sales promotion that enables a price indication changes easily with advertising information for sales promotion, and a method for indicating a price using the same.

SUMMARY OF THE INVENTION

In order to achieve the aforementioned objects according to the present invention, there is provided a price indication label and method in which the surface material of a price indication region and the surface material of an advertisement region are different from each other.

It can be advantageous if the surface material of the price indication region and the surface material of the advertisement region for a promotional slogan are different from each other, because the price change can be made easier.

Moreover it can be favourable if least one of surface materials of the price indication region and the advertisement region comprising a different colored ink for printing from a color of other regions, because the checking of the price is easier.

Furthermore it can be advantageous if at least one of surface materials of the price indication region and the advertisement region comprising a thermo sensitive multi color fixing agent, because then the checking of the price is easier.

It can also be advantageous it at least a part of a surface material of the advertisement region comprising a see through material capable for reading printed information on a surface being attached the label, because the checking of the shopping price is easier.

Moreover it can be favourable if the see through material having a cancel indication mark or strike mark for denying printed information through the material being attached the label. Then the price change can be made easier.

It can also be favourable if a back surface at least corresponds to the price indication region having a layer of adhesive material, because then the price change can be made easier.

It can also be advantageous if be at least a part of the advertisement region is capable for being folded towards to the back surface of the label to glue the folded part to be back surface so as to free from being attached. Then the price change can be made easier.

Furthermore it can be favourable if the fold line by folded towards to the back surface having perforations, because then the price change can be made easier.

It is also claimed a method for indication a current price using a price indication label comprising an attachable label body which has a price indication region capable of indication a current price and an advertisement region capable of advertising information for sales promotion in which the current price being indicated by using a different color from colors of the advertisement region, because then the checking of the shopping price is easier.

It can also be advantageous if the current price being indicated by using the surface color of the price indication region, because then the checking of the price is easier.

Furthermore it can be advantageous if a layer of adhesive material being provided on the back surface corresponding to at least the price indication region, because then the price change can be made easier.

Moreover it can be favourable if a layer of adhesive material being provided on the back surface corresponding to the price indication region and attaching the label body to a place so as to deny the printed information on the attached surface seeing through the label material, because then the price change can be easier.

It can also be advantageous folding a part of the advertisement region towards the back surface of the label body in order to glue to the back surface, because of this the price change can be made easier.

Furthermore it can be advantageous attaching the label body on a tag of merchandise. Then the checking of the price is easier.

It can also be favourable attaching the label body on a tag of merchandise, because then the checking of the price is easier.

BRIEF DESCRIPTION OF THE DRAWINGS

FIG. 5 is an explanatory view, similar to FIG. 4, of assistance in explaining alternate promotional label is to provide for using in performing a reverse printing.

FIG. 6 is a plan view of a sales promotion label for use on tag 201 that is a second embodiment of the present invention.

FIG. 7 is a sectional view taken along line II—II in FIG. 6.

DETAILED DESCRIPTION

First Embodiment of the Invention

It is explained in detail about the preferred embodiment of the promotional labels according to the present invention with reference to attached drawings.

Figure 1:
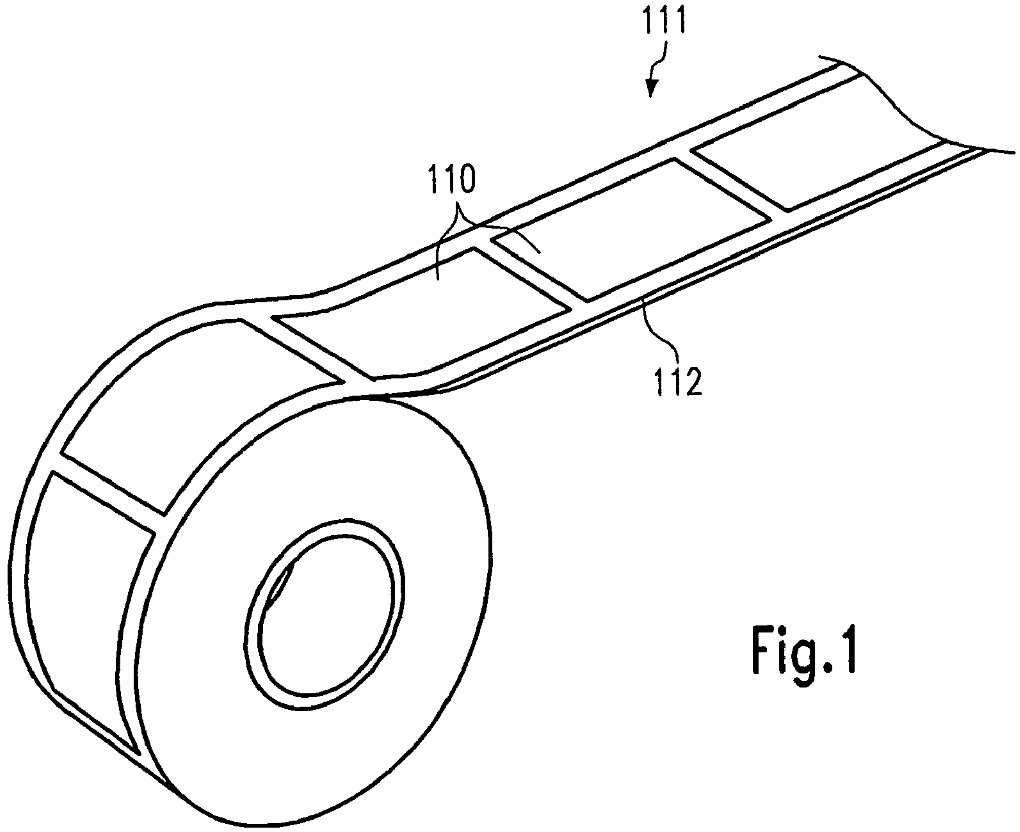
FIG. 1 is an explanatory view illustrating a first embodiment of promotional label in accordance with the invention
Figure 2:
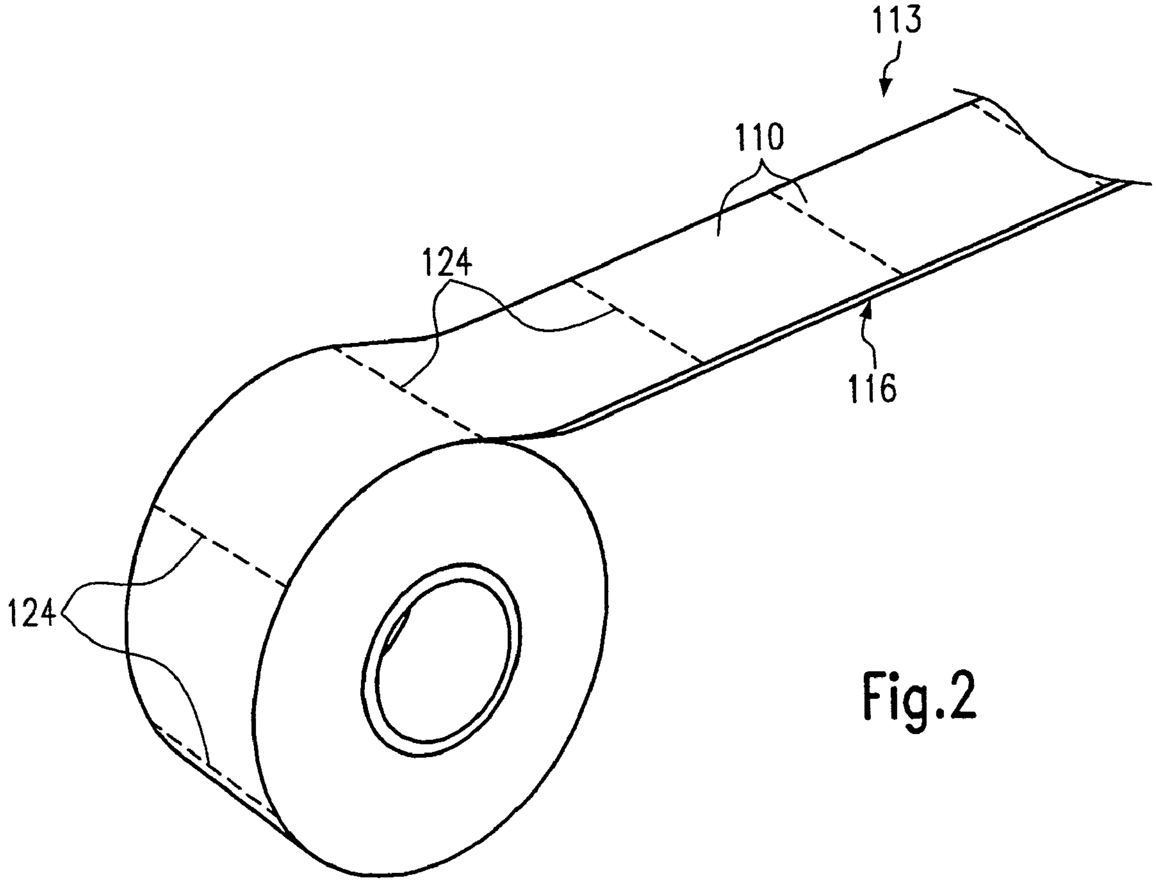
FIG. 2 is an explanatory view, similar to FIG. 1, illustrating an alternative embodiment of promotional label in accordance with this invention

A promotional label according to the present invention is good with in both cases either a continuous label strip 111 shown in FIG. 1 and a continuous label strip 113 shown in FIG. 2.

In FIG. 1, a continuous label strip 111 comprises a plural of labels 110, each of which has a pressure-sensitive adhesive coating layer on the back surface thereof, and is temporally adhered at equally spaced intervals on a continuous backing strip 112 with adhesive facing the backing strip 112 which is coated with releasable coating to facilitate removal thereof.

Figure 3A:
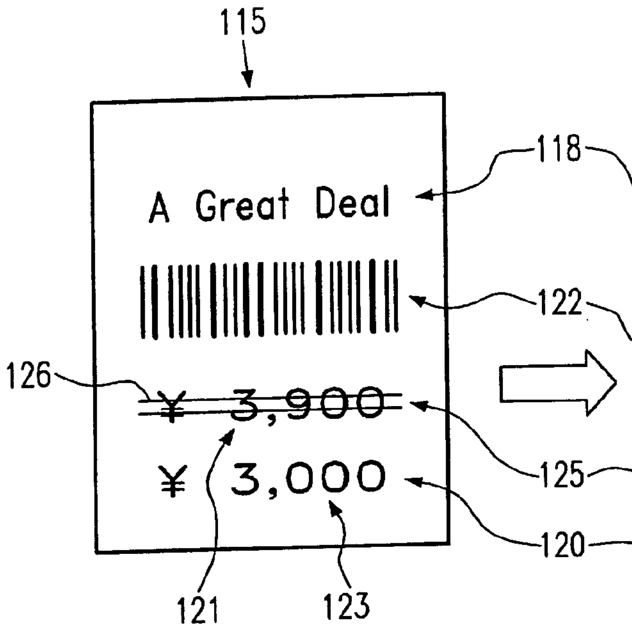
FIG. 3 is an explanatory view of assistance in explaining the printing content and the printing operation of a promotional label
Figure 3B:
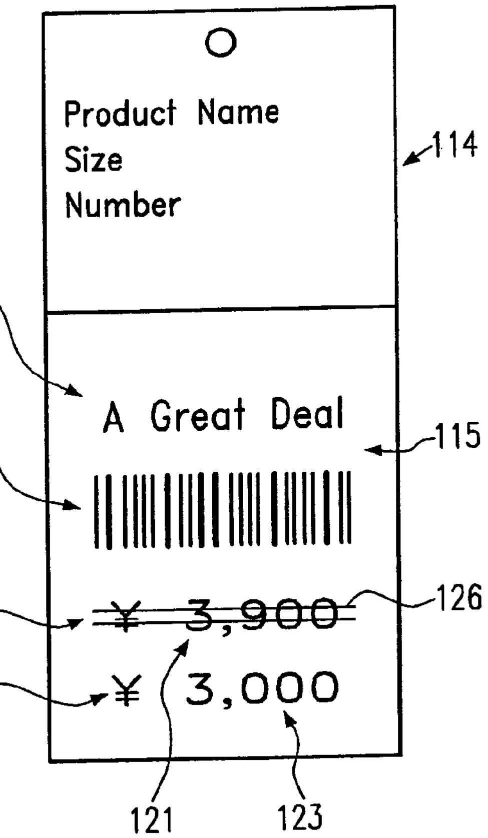

The continuous label strip 111 is in form of a roll shape and loaded in the printer (not shown). As shown in FIG. 3(*a*), the front surface of the label 110 is printed with a current sales price 123 reduced from an original sales price 121 on an advertisement region 125, a bar-code 122 corresponding to the current sales price 123 on a price reduction region 120, a promotional slogan e.g. “A Great Deal” 118 as an advertising information for sales promotion, and the like. It is very useful as a promotional label 115 that the price indication label 110 is printed with not only the current price 123 but also advertising information for sales promotion such as the promotional slogan, “A Great Deal” and the former price 121 on the advertisement region 125.

The promotional label 115 is peeled from the backing strip 112, and is put on a commodity label or a commodity tag 114 affixed on effective markdown commodity as illustrated in FIG. 3(*b*).

FIG. 3(*b*) shows a typical usage of the promotional label 115 on the commodity tag 114. Another usage of the promotional label 115 is that the label 115 directly affixed to commodities.

In FIG. 2, a continuous label 113 separated into a plural of labels 110, each of which is made of a label base material 116 coated with a pressure-sensitive adhesive coating layer on the back surface thereof, and with a release coating layer such as silicone or resin on the printing surface.

The pressure-sensitive adhesive coating layer is formed to inside surface thereof with adhesive facing the release coating layer on printing surfaces for keeping from sticking in contacting with both of the layers, so that the continuous label 113 can be wound to form in roll shape.

In this manner, the continuous label 113 in form of a roll shape can be loaded into a printer (not shown), and is also arranged, in a similar manner as described above for the continuous label 111, for printing information as shown in FIG. 3(*a*), the surface of the label 110 is printed with the slogan 118 and the former price information 125 as advertising information for sales promotion and the current sales information such as the current sales price 120 and the bar-code 122 corresponding to the current sales price and the like, and the printed label 110 is used as a promotional label 115.

It is preferable for making each unit of the label 110 from the continuous label 113 to provide a perforation line 124 between unit labels on the continuous label 113 as shown in FIG. 2. In case a perforation line is not provided between labels, a continuous label is separated along the line 124 in FIG. 2 by cutting function providing on the printing device.

As shown in FIG. 3, advertising information for sales promotion are applied to the promotional slogan 118 printed on the surface of the promotional label 115, “a Great Deal”, “special price”, “recommendable commodity”, “very article”, “advertising item” “00% OFF”, “a new supply of goods”, “new mode” and so on.

In addition, “price after the reduction” and “reduction ratio” and so on even only it is good for indication as the reduction in the current sales price information 123 which is printed on the surface of the promotional label 115, however, more preferably, to put down the former sales price 121 with a strike mark 126 on the surface of the promotional label 115 for striking the former price 121 off, allowing to increase a visual effectiveness for attracting the consumers' interests. Moreover, many promotional slogans 118 can be displayed on the promotional label 115.

The bar-code 122 corresponding to the current sales price information 123 is printed on the front surface of promotional label 115. Labels and the usage of the labels according to the present invention are not limited to the above. There may be printed as well as being in use as the bar-code corresponding to ratio of reduction in price, sales promotion products code, or price cutting period.

When the promotional slogan 118 and the current sales price 123 printed on the surface of the promotional label 115 are printed in a different color, it is preferable for increasing in visual effectiveness to achieve for providing support for the sales promotion. Particularly, it is desirable to employ a remarkable red color for the printing of the price information after the reduction in price.

Moreover, it would appear desirable for employing the multi-colored thermal sensitive paper to keep the costs down for arranging to perform multi-color printing.

The multi-color thermal paper can make a plural of different colors by a single printing operation due to differences in color developing temperature.

For example, in case there is employed a two color thermal paper which can develop a black or a red color with a printer, the label domain printing the promotional slogan 118 is heated in black color development temperature, and the black color is printed. On the other hand, the label domain printing reduction in a price indication region 120 is heated in a red color development temperature, and a current sales price 123 in red printed reduction from a former price 121 can make it remarkable.

According to a thermal printing head provided on a printing device, for example, an array of heating elements are aligned to constitute a thermal printing head, each of which is connected to a switching element. The individual switching element is operated ON-OFF switching by an output from a printing control device so as to control a heating time of each heating element, whereby the heating temperature of multi-colored thermal sensitive paper is varied.

Figure 4A:
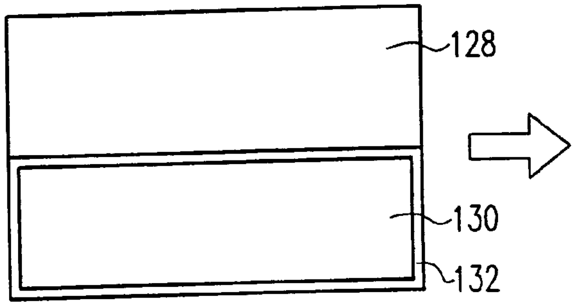
FIG. 4 is an explanatory view of assistance in explaining the promotional label is to provide for using in performing a reverse printing.
Figure 4B:
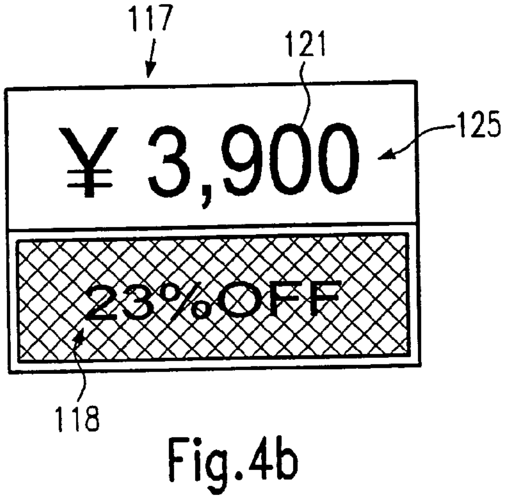

FIG. 4 shows a promotional label 117 performed with a reverse printing according to the present invention.

As to printing devices for performing reverse printing, conventional printing devices can be used. This means that it is not develop a special printing device.

A promotional label 117 can be provided for performing a reverse printing on a printing surface whole of which is printed in a single color for making an colored indication of a promotional slogans 118 and for performing a normal printing on another printing area 128.

For example, a single color was printed on a whole region 130 for printing a promotional slogan 118 herein after say a colored advertisement region 130 for promotional slogan 118 so as to make a colored-printing with the printed color on the surface of the whole region as shown in FIG. 4(*a*).

FIG. 4 shows one of embodiments according to the invention that the colored advertisement region 130 for a promotional slogan 118 is printed with yellow color in background color with black surrounded by the line frame 132 with red color.

When a thermal transferable printing is performed with black by use of a black ink ribbon provided on printer, thereby as shown in FIG. 4(*b*), it is provided a printing area 128 to be an advertisement region 125 which can be arranged for printing a original sales price 121 such as "Yen 3900" thereon, and the colored advertisement region area 130 for indicating the promotional slogan 118 such as "23% OFF" can be arranged for reverse printing thereon.

Therefore, as explained based on the forgoing example, the expression of "reverse printing" as used herein means as a methods of printing that is provided, since the colored advertisement region 130 where the yellow color is applied, to black out the colored advertisement region in a manner to form the promotional slogan 118 such as the lettering "23% off" can be obtained with yellow color.

In this manner, the original price 121 on the promotional label 117 is printed in black color and the promotional slogan 118 such as lettering "23% off" is reverse printed to be appeared in yellow over black background.

In addition, having explained the mentioned above as an example related to the methods of reverse printing, wherein it should be understand that the coloration in reverse printing is not limited to use with a yellow color in printing the colored print.

In fact, the arrangement for printing each complementary color associated with each primary color on the printing area by using printing device to make an image feature, the particular color is first printed on printing area and then the opposite another to the particular color on the color wheel is printed thereon as the colored background, which is preferable to make an appearance of the feature as it can be seen solidly (dimensionally).

FIGS. 5(*a*) and 5(*b*) show another example of a promotional label 119 preformed with a reverse printing according to the present invention. Specifically, the promotional label 119 has a price indication region for indicating the current sales price 123 and an advertisement region 125 which is arranged for applying the strikeout mark 126 to strike out an original sales price 121 and for printing with a message such as "bargain price today" as a promotional slogan 118 thereon. The original sales price 121 printed on the advertisement region 125 has been struck out by the strikeout mark 126 of the advertisement region 125 and the current price 123 is printed on the price indication region 120. As shown in FIG. 5(*a*), there is provided that a yellow color is printed on a colored printing region 134 for indicating the current sales price 123, and that halftone dot and strike mark preferably used with red color are printed on an advertisement region 136 for indicating the original sales price 121.

Moreover, the yellow color is printed on a advertisement region 138 for indicating promotional slogan 118 and a red color can also be printed in forming a line frame 132 thereon.

When using the printing device provided on a black ink ribbon formed with black color, as shown in FIG. 5(*b*), there is provided the colored printing region 134 for indicating an current sales price 123 can be arranged for reverse printing the current sales price 123 such as "Yen 3000" thereon, which is also provided an advertisement region 138 for indicating a promotional slogan 118 such as "Bargain price today" can be arranged for printing" thereon.

In this manner, the current sales price 123 such as lettering "23% Off" on the promotional label 119 is reverse printed on the colored printing area 134 for indicating the current sales price 123 to be appeared in yellow on black background, and the advertisement region 138 for indicating the promotional slogan 118 can be arranged for printing the promotional slogan 118 with black letter such as "Bargain price today" thereon, and the original sales price 121 such as the lettering "Yen 3900" is printed on the advertisement region 136 for indicating the original sales price 121 where the red colored strike mark is predetermined applied thereon, and which is therefore provided to form the promotional label 119.

In addition, when there is provided the case where a promotional label 117 or 119 is to provide for using in performing a reverse printing, it can also print the bar-code information corresponding to the current sales price 123 as well as being not shown in FIG. 4 and FIG. 5.

In this manner where reverse printing is performed which provides visual power effectiveness can be achieved in a similar manner to the operation of printing a different color for the promotional slogan 118 and the current sales price 123 printed on the promotional label by employing a single black colored printing device, and thus a low cost promotional label 117 or 119 including a visual effectiveness tending to attract the eye of a consumer can be produced and it lead to make for doing a sales promotion.

As set forth hereinabove, the present invention provides a price indication label in which having the feature not only of arranging the suitability as a labels for promoting the current sales price products but also of making the work by cash register for checking the shopping price easier and, moreover, enabling to print easily by using the printing device without increasing the costs.

Summarizing the First Embodiment of the Invention.

The present invention relates to a price indication label comprising an attachable label body which has a price indication region capable of indicating a current price and an advertisement region capable of advertising information for sales promotion. According to the present invention advantageously the surface material of the price indication region and the surface material of the advertisement region are different each other.

However, the effective impact of a label and tag per se for promoting the products is not made only in conventional arrangements for displaying promotional information for the products by affixing a printed label with reduced price to a portion of indicated price indicia on the label and tags and for displaying promotional information such as "10% percent discount", "100 Yen reduction in price" or whatever is desired on the label or tag by using the felt-pen or the like. This is because that there still remains the insufficient requirements of having not to attract the consumers' interests.

Furthermore, when cutting the price of the products, it is required to maintain a working efficiency of checkout operator for checking a shopping price. However, in order to handle the discounts by using cash register, the cash register keyboard entry is required for changing the original sales price of products into current sales price thereof by the checkout operator, so that the working efficiency is actually deteriorated.

The present invention was accomplished in light of the foregoing problems and has an object to provide a promotional label having the feature not only of arranging the suitability as a labels for promoting the current sales price products but also of making the work by cash register for checking the shopping price easier and, moreover, enabling to print easily by using the printer without increasing the costs.

The present invention provides a promotional label having at least a promotional slogan and a current sales price information, a bar-code corresponding to the current sales price and which is printed on a label and tag.

The present invention provides a promotional label which is provided a label and tag for a customer to correctly identify a great deal or extend of discounts of a corresponding original sales price products by displaying the information such as the promotional slogan or current sales price (for example a discount sales price indication or markdown ratio indication and so on of a product) thereon. This is enabling to be a trigger for attracting the consumers' interests.

In other word, printing a barcode corresponding to the current sales price on the label or tag cause the requirement only to read the barcode at the cash register without requirement to make a keystroke of the cash register for adjusting the promotional label into current sales price change for the corresponding product, so that it can substantially reduce the time necessary to and smooth to adjust customer's accounts.

Moreover, since printing the barcode corresponding to the current sales price enabling to control a circumstance of sales figure, it can promptly arrange to make the next sales initiative as to whether or not the requisite of lower price is required or the like.

In order to make the batch printing of the promotional slogan and the current sales price information, the bar-code corresponding to the current sales price information reduced in price on the label and tags, it can reduce the costs increased necessary to print them separately.

To this end, a promotional label capable of appealing to the customers' eye can be made at a low cost, and the promotional label can be affixed on a predetermined labels and tags applied on the products.

Moreover the present invention provides a promotional labels being characterized in comprising; the promotional slogan and the current sales price as described in claim 1 are printed with a different color on each other. In this manner, an increase in visual effectiveness by printing the promotional slogan and the current sales price with different color can be achieved for providing support for the sales promotion. In this case of providing that it is desirable to employ a red color to make the information reduced in price on the label and tag impressive.

Furthermore the present invention provides a promotional label being characterized in having a multi-colored thermal paper which is usable for the label per-se to arrange the promotional slogan and the current sales price on printing in different color as described above.

For example as for this, with only operation of the printer when it performs an operation of two color printing with black and red color, it is required for arranging the two-color printing to take a twice printing procedure by using a printing device with red color and a device with black color and to employ a special multi colored printing device which can perform the two-color printing with black and red color in single operation. However it would appear desirable to use the multi-colored thermal paper in response to the arrangement on a conventional printing device capable of printing one-color to provide the procedure for two-color printing in single operation. This in turn affect a low cost promotional label provided a visual effectiveness for attracting the consumers' interests can be produced.

The present invention also provides a promotional label being characterized in having a partial printing area for indicating an advertising information such as original sales price is provided on a predetermined strike mark. (as hereinafter described to delete, efface or cancel the information with drawing the mark such as parallel line, slant line or double parallel line or the like.)

In this manner, to put down the both information of original sales price and of current sales price on and thereby to provide the strike mark on the printing area for striking the original sales price off, the label can be served for customer to make a easily comparison between the current sales price and the original sales price and provide a effectiveness for attracting the consumers' interests.

To achieve the above-mentioned object, the present invention provides a promotional labels being characterized in having an partial printing area to be printed with either a promotional slogan or current sales price is arranged for making a colored printed region by printing a color on the either one of these area, and which in turn affects the colored printed area to be provided for performing a inverse printing in a manner that the figure such as photographic negative or outline typed character is printed on colored background or the like.

Moreover the present invention provides a promotional labels being characterized in having an partial printing area to be printed with either promotional slogan or current sales price is arranged for making a colored printing area by printing a color on the either one of these area, and which affects the colored printing area to be provided for performing a inverse printing in a manner that the figure as photographic negative is printed on colored background.

This manner provides visual power effectiveness can be achieved in a manner like the operation of printing a different color for the promotional slogan and the current sales price on the promotional label, so that it enables to attract the consumers' interests. In this method, moreover, to make the colored printing area on the promotional labels, since a effect to employ a conventional printing device (usually, black color is used in conventional printing device) in a similar manner to print the different color printing in single operation by multi-colored printing device can be achieved, it is, conventionally, not required for employ the multi-colored printing device. This, therefore, in turn affect a low cost promotional label provided a visual effectiveness for attracting the consumers' interests can be produced.

Furthermore the present invention provides a promotional labels as described above being characterized in having a advertising information to be printed with the type of the barcode corresponding to current salesprice.

This eliminate the need for the requirement of the cash register keyboard entry for changing the original price of products into current sales price thereof by the checkout operator in order to handle the discounts by using cash register, so that the working efficiency is actually increased.

Second Embodiment of the Invention

A sales promotion label for use on tag 201 that is a second embodiment of the invention and a method of attaching the same will next be explained with reference to FIGS. 6 to 8.

Figure 8:
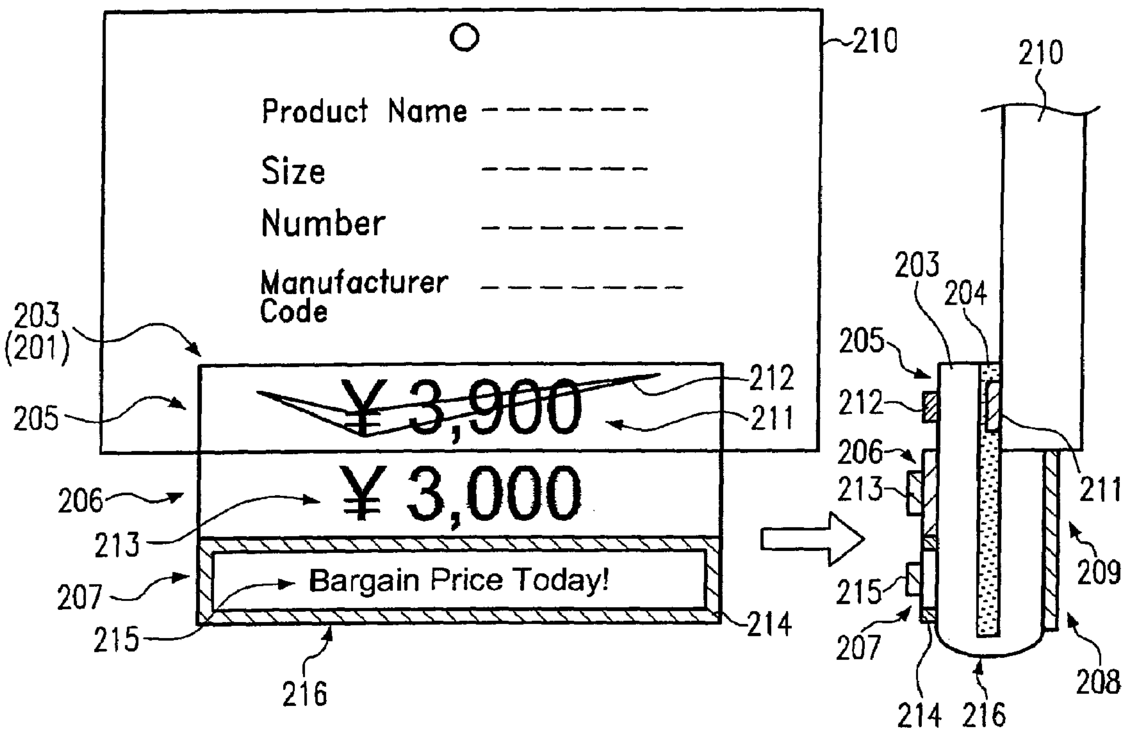
FIG. 8 is a plan view showing how the sales promotion label for use on tag 201 is used and how a price is changed.

FIG. 6 is a plan view of the sales promotion label for use on tag 201, FIG. 7 is a sectional view taken along line II—II in FIG. 6, and FIG. 8 is a plan view showing how the sales promotion label for use on tag 201 is used and how a price is changed. The sales promotion label for use on tag 201 has a backing sheet 202 and a label body 203.

The backing sheet 202 is a long strip on which the label body 203, which has a peel-off layer on its front surface and an adhesive layer 204 (FIG. 7) on its rear surface, is provisionally attached.

The label body 203 is constituted of PET film, paraffin paper or other transparent base material and has a advertising mark display region 205, price indication region herein after say modified current price display region 206, advertisement display region 207, first backing region 208 and second backing region 209.

The advertising mark display region 205 is an previous price modification region for indicating that an original sales price 211 (FIG. 8) of the merchandise printed on a tag 210 has been changed. It is displayed by printing of a check mark, double-line strikeout mark, crisscross (X) or other cancel indication mark herein after say modification mark 212 beforehand.

The modification mark 212 is printed in a conspicuous color (e.g., red) different from the ground color (e.g., white) of the surface of the tag 210, so that the characters (original salesprice 211) etc. on the other side remain visible through the transparent label body 203, and the modification mark 212 and original sales price 211 are overlaid.

The modified current price display region 206 can display the price of the merchandise after modification, i.e. a modified current sales price 213 (FIG. 8) and is printed in a ground color (e.g., yellow) different from the ground color (e.g., white) of the surface of the tag 210.

The advertisement display region 207 is printed at its border with a delineating frame 214 in a conspicuous ground color (e.g., red) different from the ground color of the tag 210 and various advertising characters and the like constituting advertising information 215 regarding the merchandise (FIG. 8; e.g., "Bargain Price Today!") can be printed inside the delineating frame 214 with a printer (not shown) to be displayed in conspicuous red or the like.

It should be noted that, if necessary, the inside of the delineating frame 214 displaying the advertising information 215 can be printed in a desired ground color (e.g., white) that contrasts well with the color of the advertising information 215 and further with the color of the delineating frame 214.

Further, the advertisement display region 207 can be printed throughout in a conspicuous ground color (e.g., red) different from the ground color of the surface of the tag 210 and the advertising information 215 can be printed and displayed on the surface printed throughout in, for example; a desired color (e.g., black) that contrasts with the color of the color printed throughout.

The first backing region 208 and second backing region 209 have the same shape and same size as the advertisement display region 207 and modified current price display region 206, respectively, i.e., are congruent therewith, and a folding perforation 216 is formed at the boundary line portion therebetween, whereby they can be attached to the respective rear surfaces thereof by fold line folding at the portion of the folding perforation 216.

The first backing region 208 and second backing region 209 can also be printed in a desired ground color (e.g., white) that contrasts well with the delineating frame 214.

As shown in FIG. 8, in the sales promotion label for use on tag 201 of this configuration, the modified current price display region 206 and advertisement display region 207 portions of the sales promotion label for use on tag 201 (the label body 203) are respectively printed with the modified current sales price 213 and the advertising information 215 (FIG. 8; "Bargain Price Today!") using a prescribed printer (not shown), whereafter the label body 203 is peeled from the backing sheet 202 and attached to the tag 210 so that the modification mark 212 of the mark display region 205 is superimposed on the original sales price 211 portion of the tag 210 and the modified current price display region 206, advertisement display region 207, first backing region 208 and second backing region 209 project outward from the region of the tag 210.

Moreover, folding the first backing region 208 and second backing region 209 at the folding perforation 216 and sticking them to the rear surface sides of the advertisement display region 207 and modified current price display region 206, respectively, as shown in the sectional view of FIG. 8, makes it possible to prevent the adhesive layer 204 on the rear surface of the advertisement display region 207 and modified current price display region 206 from sticking to other portions, while the white (for example) first backing region 208 and second backing region 209 help to make the advertising information 215 stand out even more.

Therefore, the fact that the original sales price 211 as previous price of the merchandise, e.g., Yen 3900, printed on the tag 210 has been struck out by the modification mark 212 of the advertising mark display region 205, the fact that the modified current sales price 213 is, for example, Yen 3,000, and the fact the advertising information 215 is "Bargain Price Today!" can be simultaneously and simply displayed.

In addition, since the modified price display region 206 displaying the modified price 213 and the advertisement display region 207 displaying the modified current sales price 213 both project outward from the region of the tag 210, they are made conspicuous to enhance their visual impact on the purchaser.

It should be noted that the positional relationship between the modified current price display region 206 and advertisement display region 207 is arbitrary and either can be located above or below or on the right or left.

Further, the sales promotion label for use on tag 201 can be provided in a form with no adhesive layer 204 formed on the label body 203 and be attached not by sticking but by some other means such as one or more staples, or in the form of a sticky label with no backing sheet.

Moreover, the label body in the present invention need not be constituted using a transparent base.

When the label body is constituted in the conventional manner using opaque bond paper, for example, the original sales price 211 and modification mark 212 can be first printed on the mark display region 205 (the modification mark 212 preferably being printed in red or some other color different from that of the old price 211) and the mark display region 205 thereafter be attached to cover the old price 211 on the tag 210.

Figure 9:
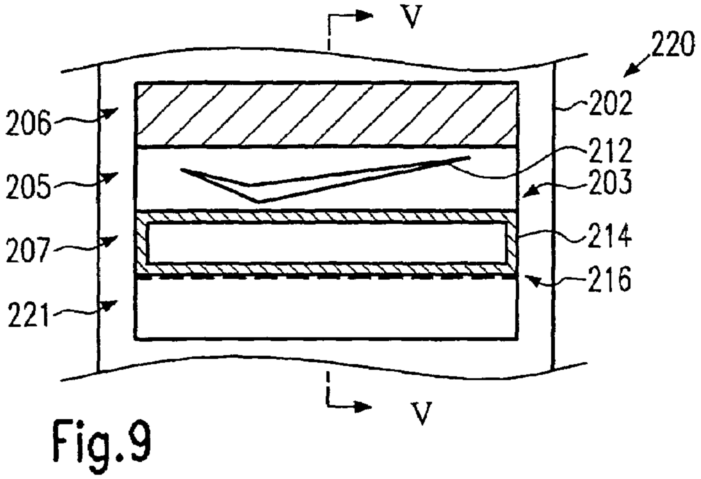
FIG. 9 is a plan view of a sales promotion label for use on tag 220 that is a variation of the second embodiment of the present invention.
Figure 10:
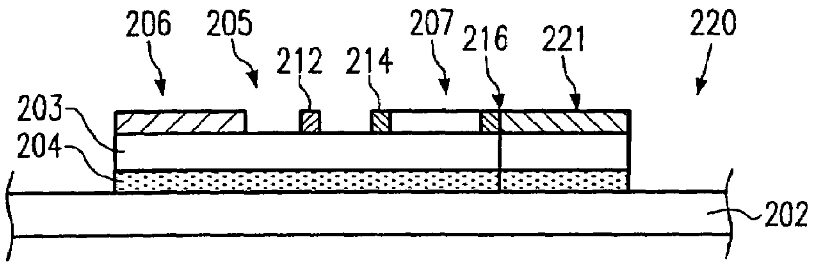
FIG. 10 is a sectional view taken along line V—V in FIG. 9.
Figure 11:
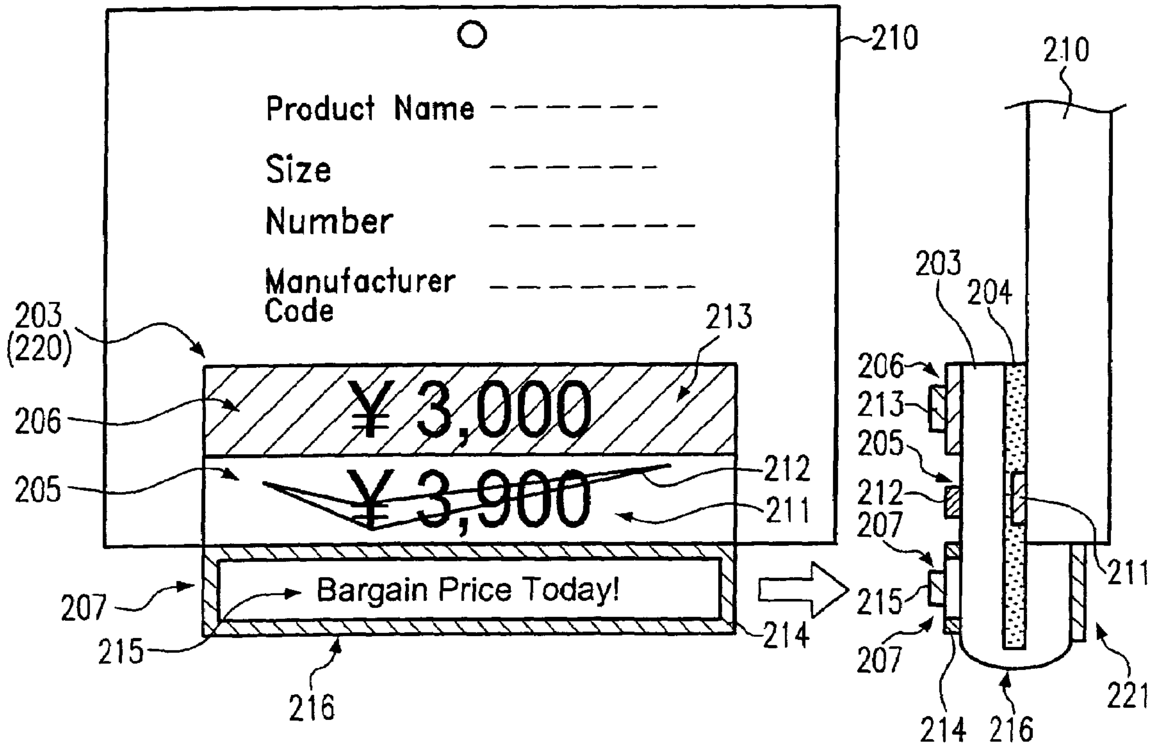
FIG. 11 is a plan view showing how the sales promotion label for use on tag 220 is used and how a price is changed.

FIG. 9 is a plan view of a sales promotion label for use on tag 220 that is a variation of the second embodiment of the present invention, FIG. 10 is a sectional view taken along line V—V in FIG. 9, and FIG. 11 is a plan view showing how the sales promotion label for use on tag 220 is used and how a price is changed. The sales promotion label for use on tag 220 has a backing sheet 202 and a label body 203. The label body 203 is formed with a advertising mark display region 205, a modified current price display region 206, an advertisement display region 207 and a single backing region 221.

The advertisement display region 207 is printed at its border with a delineating frame 214 in a conspicuous ground color (e.g., red) different from the ground color of the tag 210 and various advertising characters and the like constituting advertising information 215 regarding the merchandise (FIG. 11; e.g., "Bargain Price Today!") can be printed inside the delineating frame 214 with a printer (not shown) to be displayed in conspicuous red or the like.

It should be noted that, if necessary, the inside of the delineating frame 214 displaying the advertising information 215 can be printed in a desired ground color (e.g., white) that contrasts well with the color of the advertising information 215 and further with the color of the delineating frame 214.

Like the first backing region 208 and second backing region 209 (FIG. 6), the backing region 221 has the same shape and same size as the advertisement display region 207, i.e., is congruent therewith. It is located adjacent to the advertisement display region 207, at a lower tier in the illustrated example, and a folding perforation 216 is formed at the boundary line portion between the advertisement display region 207 and backing region 221.

The backing region 221 can also be printed in a desired ground color (e.g., white) that contrasts well with the delineating frame 214.

The backing region 221 can be folded at the folding perforation 216 portion and attached to the rear surface side of the advertisement display region 207.

As shown in FIG. 11, in the sales promotion label for use on tag 220 of this configuration, the modified current price display region 206 and advertisement display region 7 portions of the sales promotion label for use on tag 220 (the label body 203) are respectively printed with the modified current sales price 213 and the advertising information 215 (FIG. 11; "Bargain Price Today!") using a prescribed printer (not shown), whereafter the label body 203 is peeled from the backing sheet 202 and attached to the tag 210 so that the modification mark 212 of the mark display region 205 is superimposed on the old price 211 portion of the tag 210 and the advertisement display region 207 and backing region 221 project outward from the region of the tag 210.

Moreover, folding the backing region 221 at the folding perforation 216 and sticking it to the rear surface side of the advertisement display region 207, as shown in the sectional view of FIG. 11, makes it possible to prevent the adhesive layer 204 on the rear surface of the advertisement display region 207 from sticking to other portions, while the white (for example) backing region 221 helps to make the advertising information 215 stand out even more.

Figure 12:
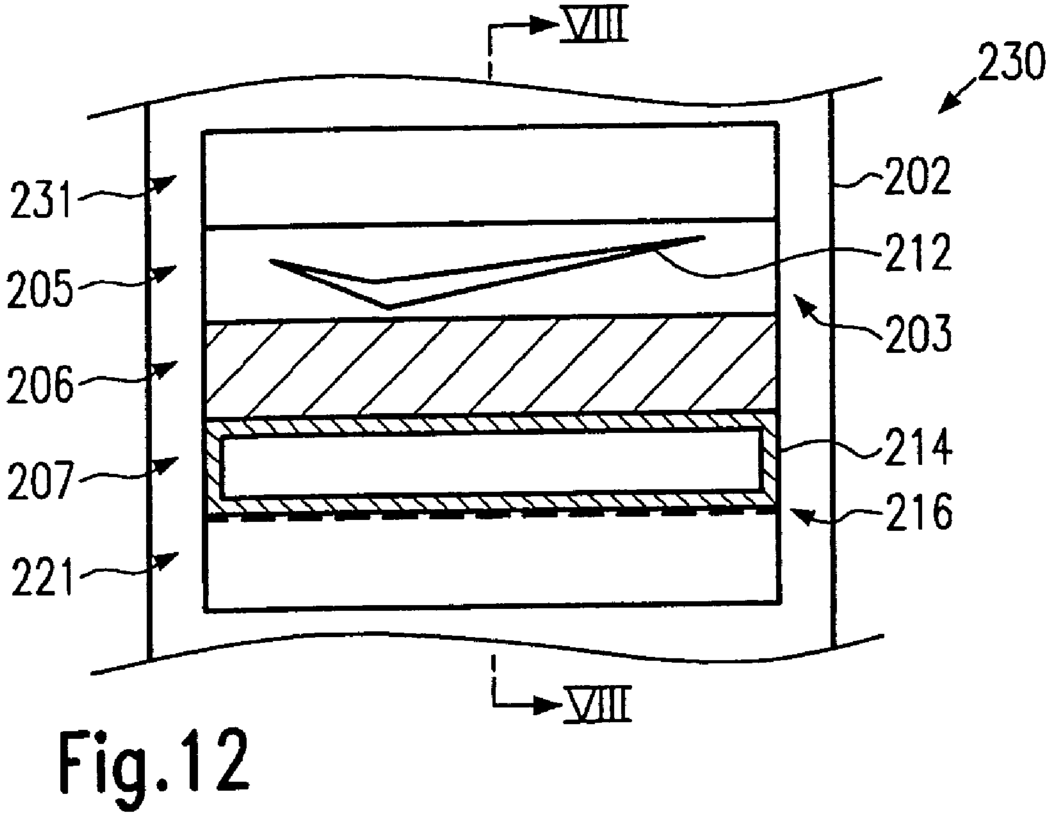
FIG. 12 is a plan view of a sales promotion label for use on tag 230 that is a second variation of the second embodiment of the present invention.
Figure 13:
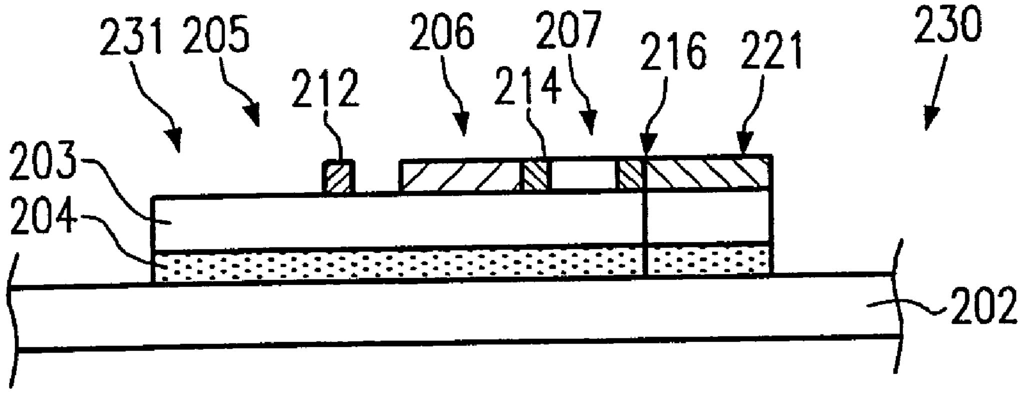
FIG. 13 is a sectional view taken along line VIII—VIII in FIG. 12.
Figure 14:
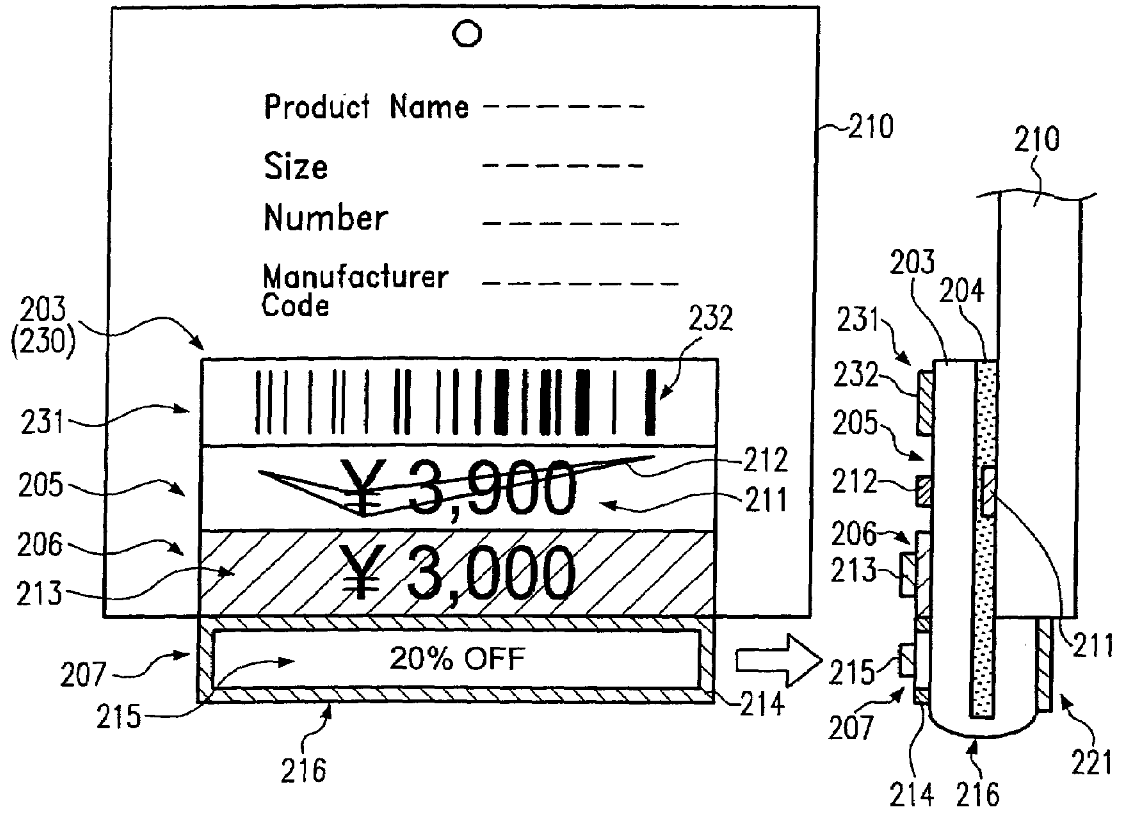
FIG. 14 is a plan view showing how the sales promotion label for use on tag 230 is used and how a price is changed.

FIG. 12 is a plan view of a sales promotion label for use on tag 230 that is a second variation of the second embodiment of the present invention, FIG. 13 is a sectional view taken along line VIII—VIII in FIG. 12, and FIG. 14 is a plan view showing how the sales promotion label for use on tag 230 is used and how a price is changed. The sales promotion label for use on tag 230 has a backing sheet 202 and a label body 203. The label body 203 is formed with a advertising mark display region 205, modified price display region 206, advertisement display region 207, single backing region 221 and, in addition, a barcode display region 231.

The barcode display region 231 can display barcode information 232 (FIG. 14) corresponding to the modified price 213 newly printed and displayed at the modified price display region 206 and information related thereto, and/or other information.

Like the earlier described sales promotion label for use on tag 201 (FIG. 6) and sales promotion label for use on tag 220 (FIG. 9), the sales promotion label for use on tag 230 of this configuration can also contribute to merchandise sales promotion by enabling simple display of various sales promotion information. It can also contribute to efficient sales processing by enabling machine reading of information relating to the modified price 213.

It should be noted that in the present invention it is possible in regions other than the advertising mark display region 205 containing the modification mark 212, namely, in the modified price display region 206, advertisement display region 207 and barcode display region 231, to display not only the exemplified sales promotion information but also desired sales promotion information, starting with the merchandise modified current sales price 213 but also including advertising information 215 consisting of various advertising characters, e.g., “20% OFF,” or barcode information 232. For instance, the modified current sales price 213 can be displayed inside the delineating frame 214 of the advertisement display region 207.

Further, although paired regions, such the advertisement display region 207 and backing region 221 (FIGS. 9 and 12), the first backing region 208 and second backing region 209, and the advertisement display region 207 and modified current price display region 206 (FIG. 6), must be adjacent to each other and positioned at the end portion of the label body 203, the positional relationship among the regions 205, 206, 207 and 231 is arbitrary.

As explained in the foregoing, the present invention provides a modified current price display region capable displaying a modified current sales price and an advertisement display region capable of displaying advertising information and enables attachment such that at least the advertisement display region projects from the tag. Therefore, since the work of modifying the price and the work of displaying the modified current price can be carried out simultaneously, workability is excellent, and at least the advertising information can be made conspicuous to heighten purchaser desire to purchase and contribute to sales promotion.

Summarizing the Second Embodiment

To provide a sales promotion label for use on tag and a method of attaching the same that can heighten purchaser desire to purchase by indicating price reduction, sales promotion information and the like capable of promoting merchandise sales in a manner projecting from a tag region and can display a changed price, various advertising information and other required sales promotion information even when little space is available on the tag for attaching a sales promotion label.

Focusing on enabling a modified current sales price, various advertising information and other sales promotion information to be displayed in a projecting manner popping outward from the boundary of a tag, a label body 203 attachable to the tag has a modified current price display region 206 capable of displaying a modified current sales price of the merchandise and an advertisement display region 207 capable of displaying advertising information regarding the merchandise, and can be attached to the tag with at least the advertisement display region projecting from the tag.

The present invention was accomplished in light of the foregoing problems and has as its object to provide a sales promotion label for use on tag that can enhance merchandise sales promotion by, for instance, indicating price reduction and sales promotion information, and a method of attaching the same.

Another object of the present invention is to provide a sales promotion label for use on tag that can indicate in a conspicuous manner various information capable of promoting merchandise sales, and a method of attaching the same.

Another object of the present invention is to provide a sales promotion label for use on tag that can indicate various information capable of promoting merchandise sales in a manner projecting from the tag region, and a method of attaching the same.

Another object of the present invention is to provide a sales promotion label for use on tag that can heighten purchaser desire to purchase through a visual effect produced by displaying various information of appealing appearance capable of promoting merchandise sales, and a method attaching the same.

Another object of the present invention is to provide a sales promotion label for use on tag that can display a modified price, various advertising information and other required sales promotion information even when little space is available on the tag for attaching a sales promotion label for price reduction or sales promotion.

Specifically, the present invention focuses on enabling a modified price, various advertising information and other sales promotion information to be displayed in a projecting manner popping outward from the boundary of a tag. In a first aspect, the invention provides a sales promotion label for use on tag to promote sales of merchandise attached with a tag displaying a price of the merchandise, which sales promotion label for use on tag is characterized in comprising a label body attachable to the tag, the label body having a price indication region as modified current price display region capable of displaying a modified current sales price of the merchandise and an advertisement display region capable of displaying advertising information regarding the merchandise so as to make a surface materials of the label body is different on each other, and being attachable to the tag with at least the advertisement display region projecting from the tag.

In a second aspect, the invention provides a method of attaching a sales promotion label for use on tag to promote sales of merchandise attached with a tag displaying a price of the merchandise, which method of attaching a sales promotion label for use on tag is characterized in comprising: forming a label body attachable to the tag with a modified price display region capable of displaying a modified price of the merchandise and an advertisement display region capable of displaying advertising information regarding the merchandise, and, once the modified current sales price has been displayed on the modified current price display region, enabling attaching the label body to the tag with at least the advertisement display region projecting from the tag.

The modified current price display region can be printed in a ground color different from the ground color of the surface of the tag.

The advertisement display region can be printed at its border with a delineating frame in a ground color different from the ground color of the surface of the tag and the advertising information can be displayed inside the delineating frame.

The advertisement display region can be printed throughout in a ground color different from the ground color of the surface of the tag and the advertising information can be displayed on the surface printed throughout.

A backing region can be provided that is congruent with the advertisement display region and can be folded at a boundary line portion folded by fold line between itself and the advertisement display region to be attached to the rear surface side of the advertisement display region.

A folding perforation can be formed at the boundary line portion between the backing region and the advertisement display region.

The label body can be constituted of a transparent base, the label body be formed with a mark display region for displaying a modification mark indicating that the price of the merchandise has been changed, and the mark display region be attached to the tag as overlaid on the price displayed on the tag.

As means for attaching the sales promotion label for use on tag to the tag there can be adopted a configuration provided with an adhesive layer on the rear surface of the label body to enable attachment to the tag, means employing a stapler or other fastener, or any other desired means.

In the sales promotion label for use on tag and the method of attaching the same according to the present invention, an advertisement display region capable of displaying advertising information regarding the merchandise is provided, at least the advertisement display region is made capable of attachment in a manner projecting outward from the tag boundary and, in addition to displaying a new modified price in a modified price display region, sales promotion information such as "Bargain Price Today" or "20% OFF" is displayed in the advertisement display region, and the advertisement display region is positioned in the manner of a hanging advertisement to make it visually conspicuous and intensify the sales promotion effect.

Of particular note regarding the first aspect of the present invention is that since the label body is provided with a modified price display region and an advertisement display region and made attachable to a tag with at least the advertisement display region projecting outward from the tag boundary, the advertisement display region can, as mentioned above, be made visually conspicuous to intensify the sales promotion effect and enable attachment and display of the minimum required information even when the space on the tag where attachment is possible is limited.

Of particular note regarding the second aspect of the present invention is that once a modified price and advertising information have been displayed by printing with an appropriate printer or the like, at least the advertisement display region and if necessary also the modified price display region can be attached to the tag in a manner projecting from the tag, so that the sales promotion label for use on tag can be attached with good workability and without hiding other information displayed on the tag.

Third Embodiment of the Invention

A sales promotion label for use on tag 301 that is a third embodiment of the invention and a method of changing a price using the same will next be explained with reference to FIGS. 15 to 17.

Figure 15:
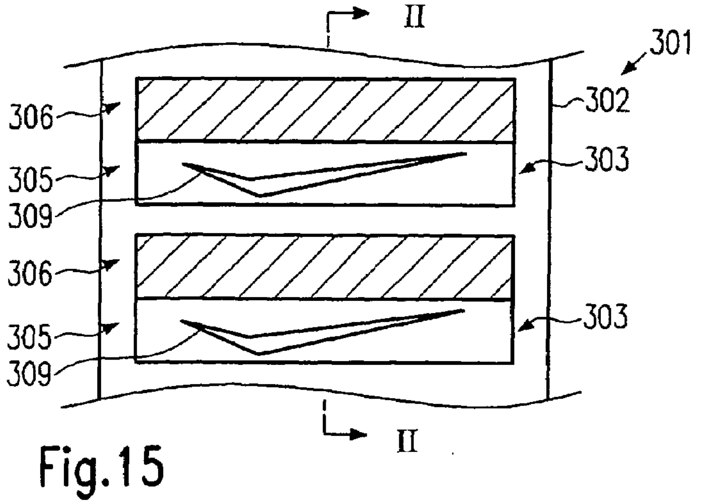
FIG. 15 is a plan view of a sales promotion label for use on tag 301 that is a third embodiment of the present invention.
Figure 16:
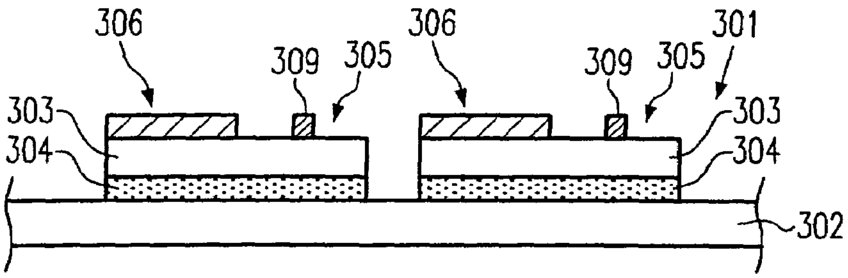
FIG. 16 is a sectional view taken along line II—II in FIG. 15.
Figure 17:
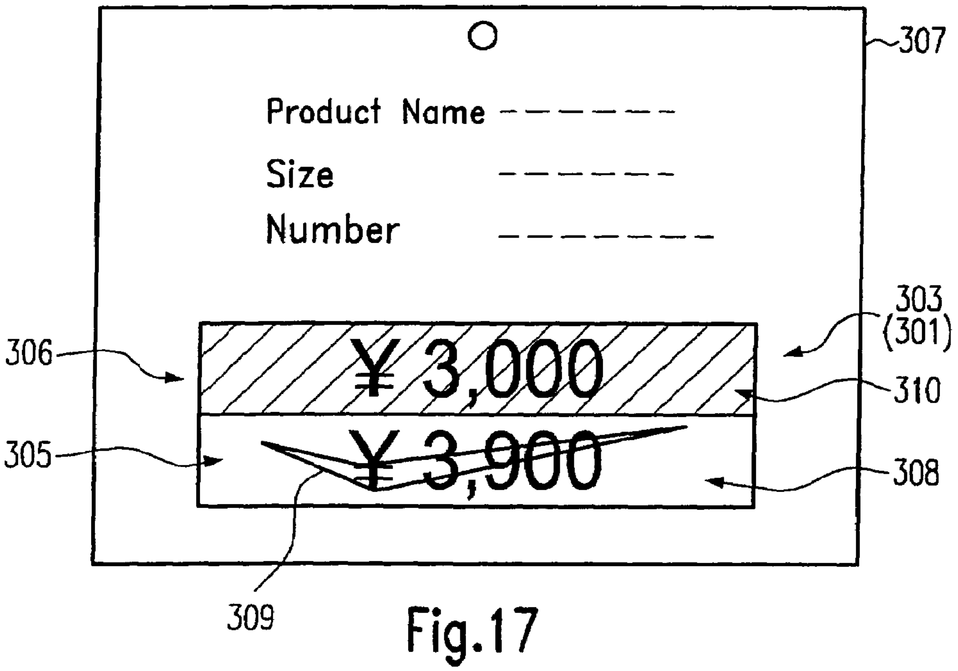
FIG. 17 is a plan view showing how the sales promotion label for use on tag 301 is used and how a price is changed.

FIG. 15 is a plan view of the sales promotion label for use on tag 301, FIG. 16 is a sectional view taken along line II—II in FIG. 15, and FIG. 17 is a plan view showing how the sales promotion label for use on tag 301 is used and how a price is changed. The sales promotion label for use on tag 301 has a backing sheet 302 and a label body 303.

The backing sheet 302 is a long strip on which label bodies 303, each having a peel-off layer on its front surface and an adhesive layer 304 (FIG. 16) on its rear surface, are provisionally attached.

The label body 303 is constituted of PET film, paraffin paper or other transparent base material and has a advertising mark display region 305 and a modified current price display region 306.

The mark display region 305 is an old price modification region for indicating that an original sales price 308 (FIG. 17) of the merchandise printed on a tag 307 (FIG. 17) has been changed. It is displayed by printing of a check mark, double-line strikeout mark, crisscross (X) or other a cancel indication mark as herein after say modification mark 309 beforehand.

The modification mark 309 is printed in a conspicuous color (e.g., red) different from the ground color (e.g., white) of the surface of the tag 307, so that the characters (original sales price 308) etc. on the other side remain visible through the transparent label body 303, and the modification mark 309 and old price 308 are overlaid.

The modified price display region 306 can display the price of the merchandise after modification, i.e. a modified current sales price 310 (FIG. 17) and is printed in a ground color (e.g., yellow) different from the ground color (e.g., white) of the surface of the tag 307.

As shown in FIG. 17, in the sales promotion label for use on tag 301 of this configuration, the modified current price display region 306 portion of the sales promotion label for use on tag 301 (the label body 303) is printed with the new modified current sales price 310, using a prescribed printer (not shown), whereafter the label body 303 is peeled from the backing sheet 302 and attached to the tag 307 so that the modification mark 309 of the mark display region 305 is superimposed on the original sales price 308 portion of the tag 307.

Therefore, the fact that the original sales price 308 of the merchandise, e.g., Yen 3900, such as previous sales price from the modified current sales price 310, printed on the tag 307 has been struck out by the modification mark 309 of the mark display region 305 and the fact that the modified current sales price 310 is, for example, Yen 3,000 can be simultaneously and simply displayed.

It should be noted that the positional relationship between the mark display region 305 and the modified current price display region 306 is arbitrary and either can be located above or below or on the right or left. When the modified current price display region 306 is disposed at a lower tier than the mark display region 305, advertising effect can be enhanced by attachment to the tag 307 so that the modified price display region 306 projects outside of the region of the tag 307.

Further, the sales promotion label for use on tag 301 can be provided in a form with no adhesive layer 304 formed on the label body 303 and be attached not by sticking but by some other means such as one or more staples, or in the form of a sticky label with no backing sheet that does not use the backing sheet 302.

Figure 18:
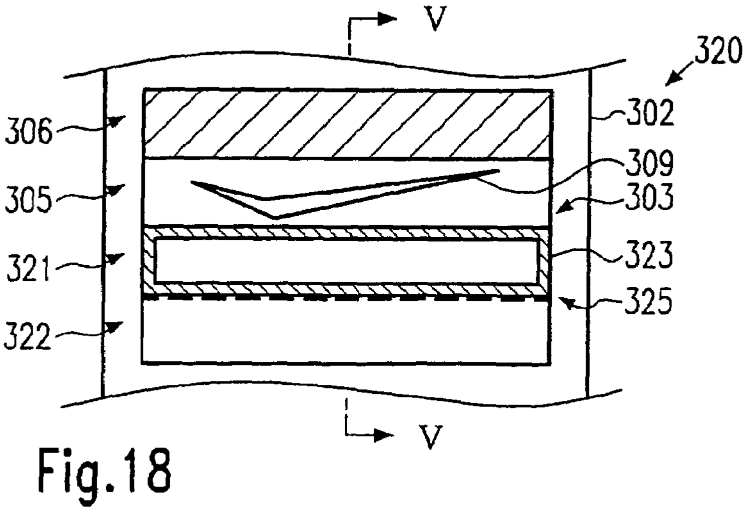
FIG. 18 is a plan view of a sales promotion label for use on tag 320 that is a first variation of the third embodiment of the present invention.
Figure 19:
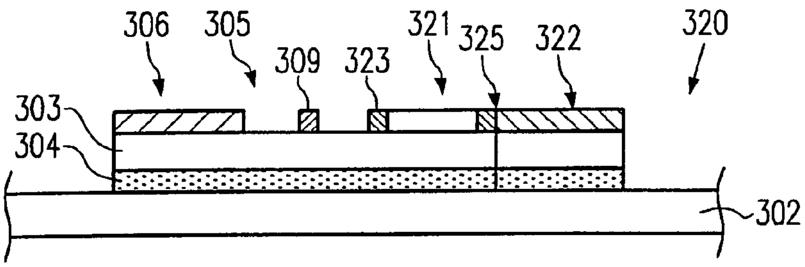
FIG. 19 is a sectional view taken along line V—V in FIG. 18.
Figure 20:
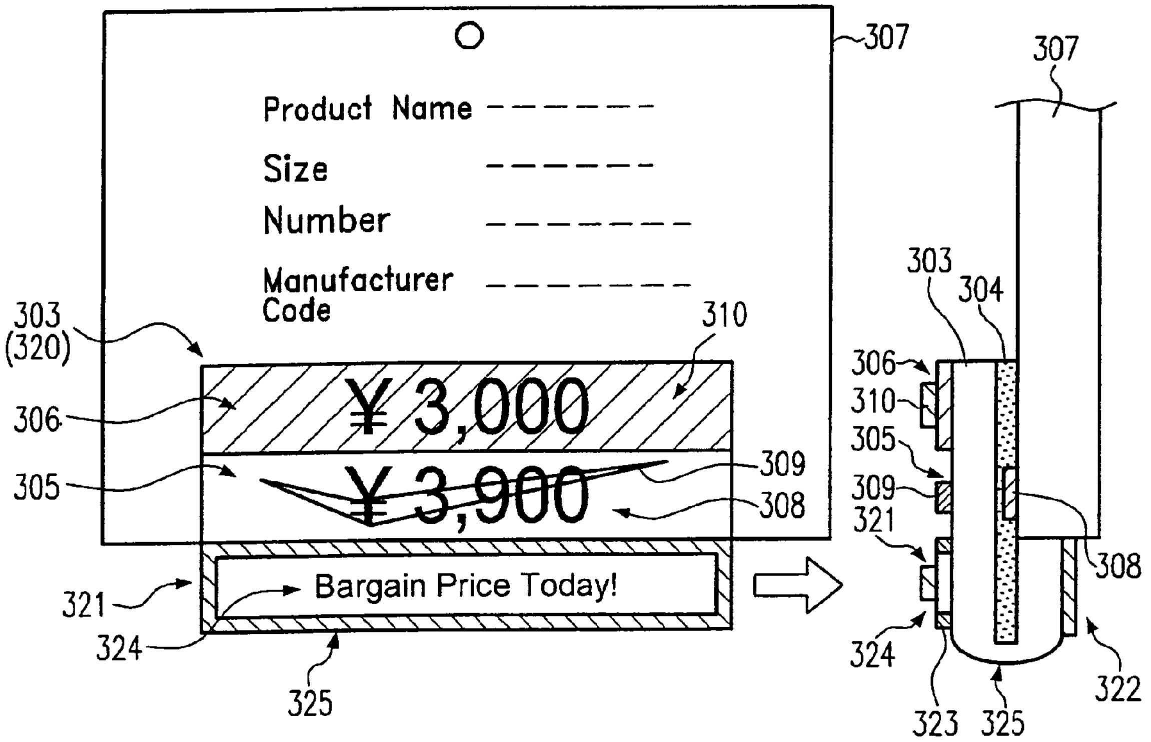
FIG. 20 is a plan view showing how the sales promotion label for use on tag 320 is used and how a price is changed.

FIG. 18 is a plan view of a sales promotion label for use on tag 320 that is a first variation of the third embodiment of the present invention, FIG. 19 is a sectional view taken along line V—V in FIG. 18, and FIG. 20 is a plan view showing how the sales promotion label for use on tag 320 is used and how a price is changed. The sales promotion label for use on tag 320 has a backing sheet 302 and a label body 303. The label body 303 is formed with a mark display region 305, a modified price display region 306 and, in addition, an advertisement display region 321 and a backing region 322.

The advertisement display region 321 is printed at its border with a delineating frame 323 in a conspicuous ground color (e.g., red) different from the ground color of the surface of the tag 307 and various advertising characters and the like constituting advertising information 324 regarding the merchandise (FIG. 20; e.g., "Bargain Price Today!") can be printed inside the delineating frame 323 with the printer (not shown) to be displayed in conspicuous red or the like.

It should be noted that, if necessary, the inside of the delineating frame 323 displaying the advertising information 324 can be printed in a desired ground color (e.g., white) that contrasts well with the color of the advertising information 324 and further with the color of the delineating frame 323.

Further, the advertisement display region 321 can be printed throughout in a conspicuous ground color (e.g., red) different from the ground color of the surface of the tag 307 and the advertising information 324 can be printed and displayed on the surface printed throughout in, for example, a desired color (e.g., black) that contrasts with the color of the color printed throughout.

The backing region 322 has the same shape and same size as the advertisement display region 321, i.e., is congruent therewith. It is located adjacent to the advertisement display region 321, a tier below in the illustrated example, and a folding perforation 325 is formed at the boundary line portion between the advertisement display region 321 and backing region 322.

The backing region 322 can also be printed in a desired ground color (e.g., white) that contrasts well with the delineating frame 323.

The backing region 322 can be folded at the folding perforation 325 portion and attached to the rear surface side of the advertisement display region 321.

As shown in FIG. 20, in the sales promotion label for use on tag 320 of this configuration, the modified current price display region 306 and advertisement display region 321 of the sales promotion label for use on tag 320 (the label body 303) are respectively printed with the new modified price 310 and the advertising information 324 (FIG. 20; "Bargain Price Today!") using a prescribed printer (not shown), whereafter the label body 303 is peeled from the backing sheet 302 and attached to the tag 307 so that the modification mark 309 of the advertising mark display region 305 is superimposed on the original sales price 308 portion of the tag 307 and the advertisement display region 321 and backing region 322 project outward from the region of the tag 307.

Moreover, folding the backing region 322 at the folding perforation 325 and sticking it to the rear surface side of the advertisement display region 321, as shown in the sectional view of FIG. 20, makes it possible to prevent the adhesive layer 304 on the rear surface of the advertisement display region 321 from sticking to other portions, while the white (for example) backing region 322 helps to make the advertising information 324 stand out even more.

Figure 21:
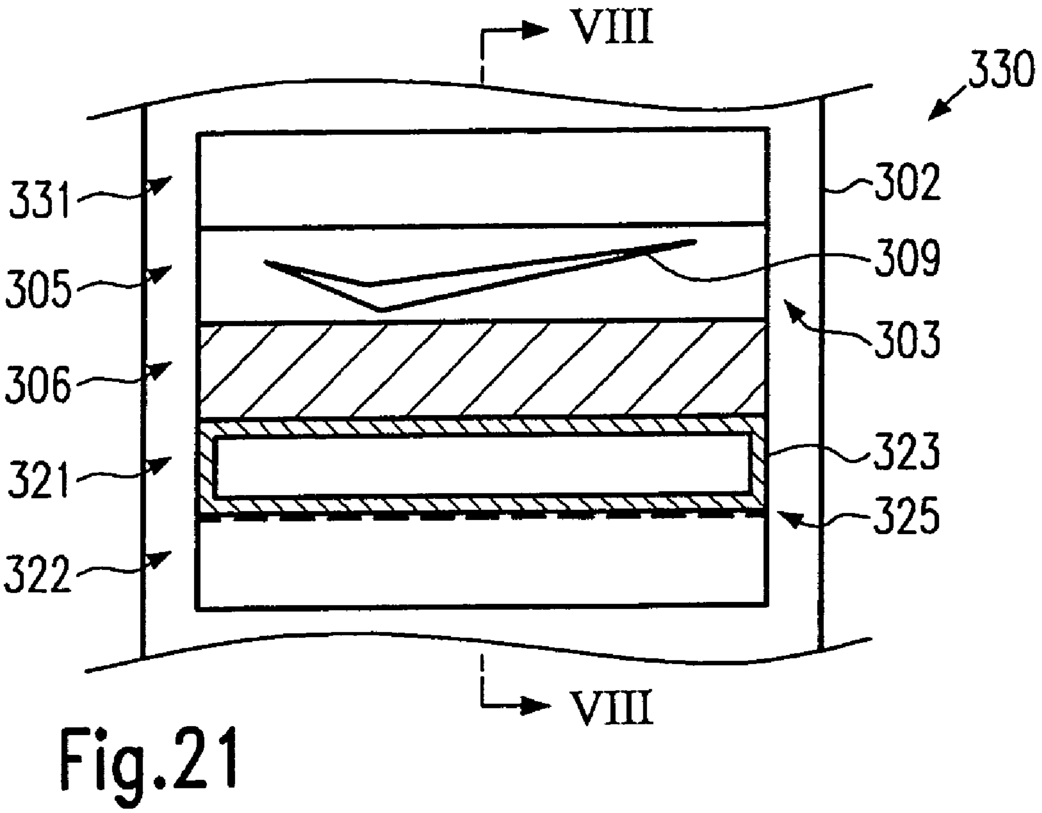
FIG. 21 is a plan view of a sales promotion label for use on tag 330 that is a second variation of the third embodiment of the present invention.
Figure 22:
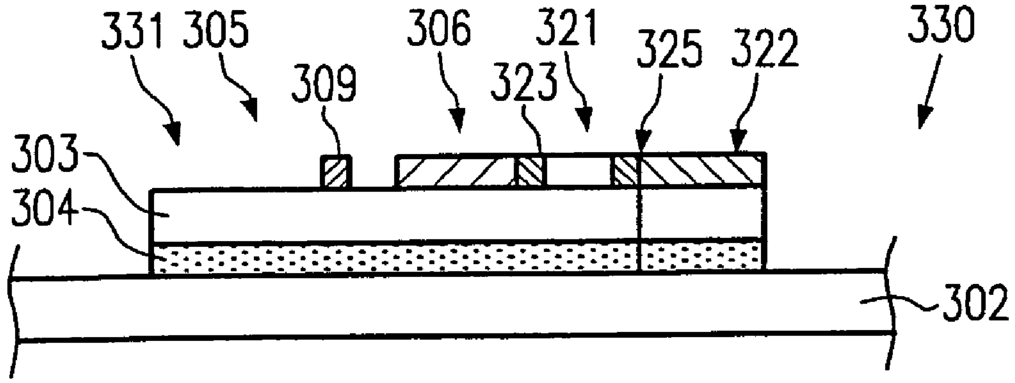
FIG. 22 is a sectional view taken along line VIII—VIII in FIG. 21.
Figure 23:
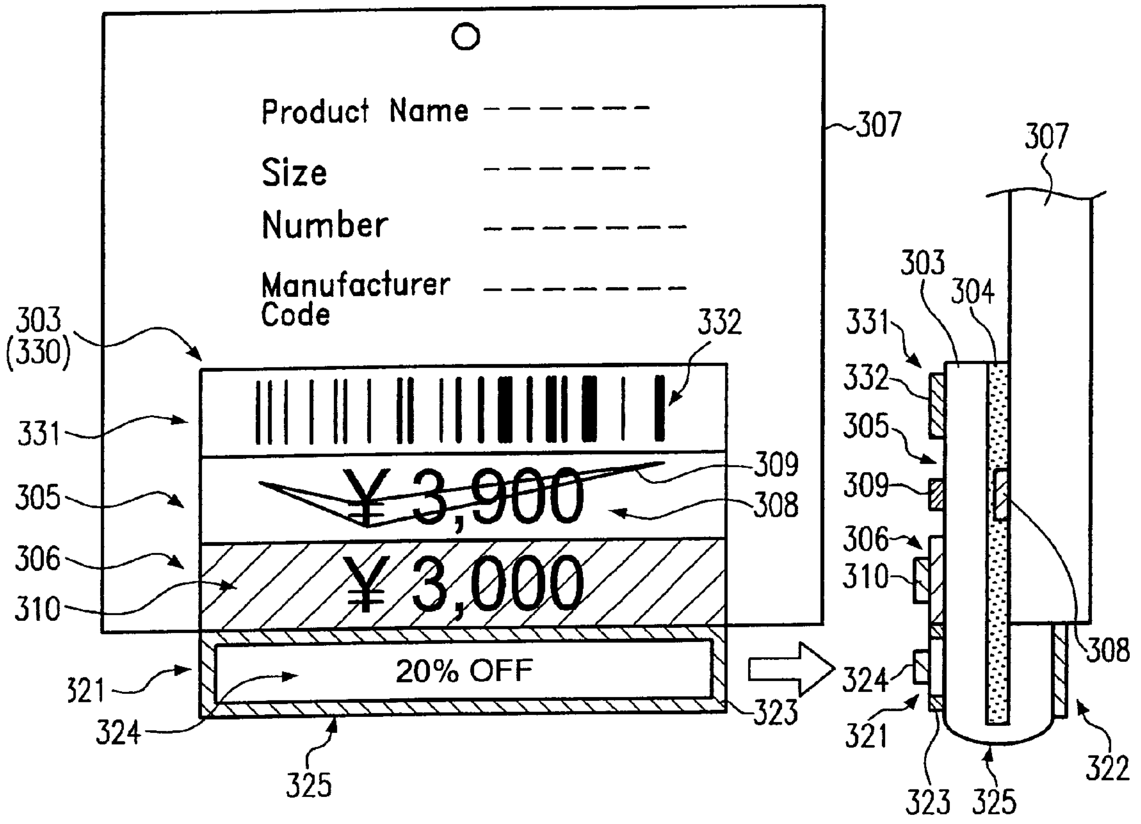
FIG. 23 is a plan view showing how the sales promotion label for use on tag 330 is used and how a price is changed.

FIG. 21 is a plan view of a sales promotion label for use on tag 330 that is a second variation of the third embodiment of the present invention, FIG. 22 is a sectional view taken along line VIII—VIII in FIG. 21, and FIG. 23 is a plan view showing how the sales promotion label for use on tag 330 is used and how a price is changed. The sales promotion label for use on tag 330 has a backing sheet 302 and a label body 303. The label body 303 is formed with a advertising mark display region 305, modified current price display region 306, advertisement display region 321, backing region 322 and, in addition, a barcode display region 331.

The barcode display region 331 can display barcode information 332 (FIG. 23) corresponding to the modified current sales price 310 newly printed and displayed at the modified current price display region 306 and information related thereto, and/or other information.

Like the earlier described sales promotion label for use on tag 301 (FIG. 15) and sales promotion label for use on tag 320 (FIG. 18), the sales promotion label for. use on tag 330 of this configuration can also contribute to merchandise sales promotion by enabling simple display of various sales promotion information. It can also contribute to efficient sales processing by enabling machine reading of information relating to the modified price 313.

Figure 24:
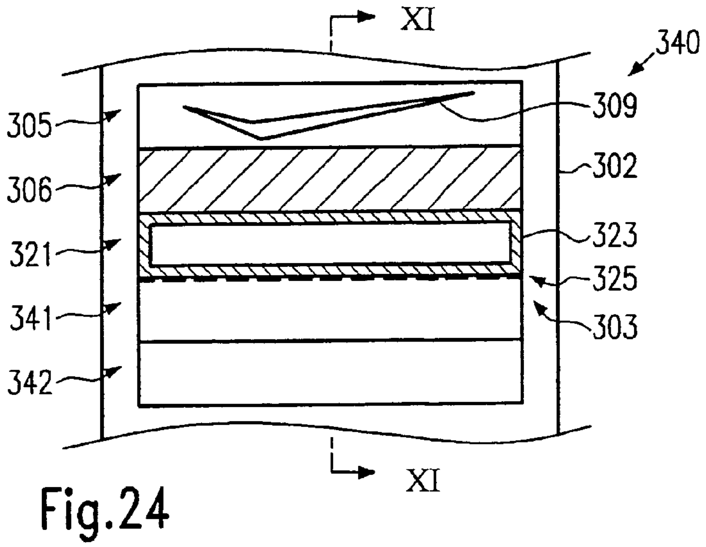
FIG. 24 is a plan view of a sales promotion label for use on tag 340 that is a third variation of the third embodiment of the present invention.
Figure 25:
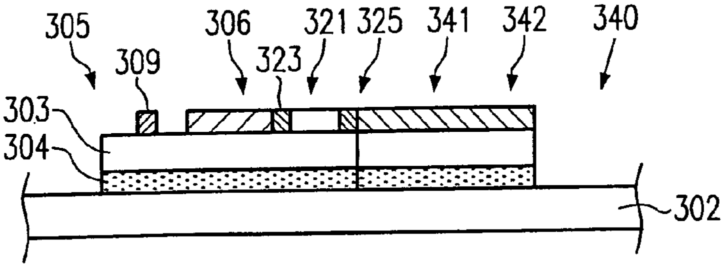
FIG. 25 is a sectional view taken along line XI—XI in FIG. 21.
Figure 26:
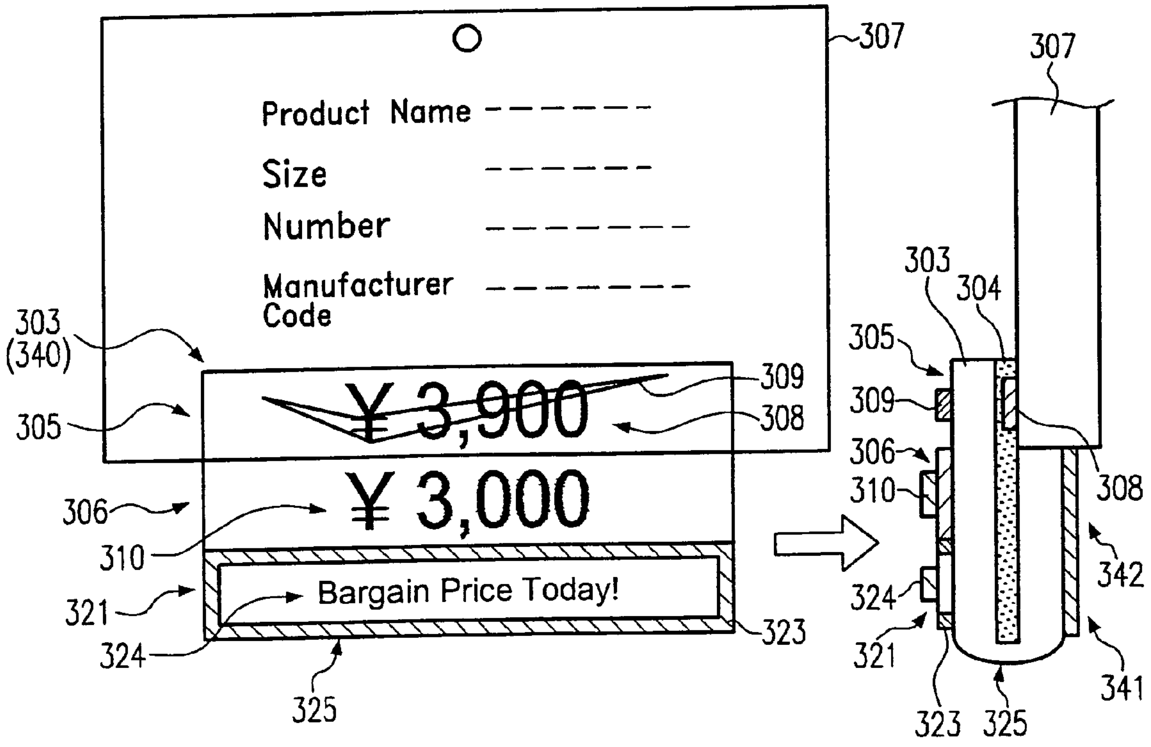
FIG. 26 is a plan view showing how the sales promotion label for use on tag 340 is used and how a price is changed.

FIG. 24 is a plan view of a sales promotion label for use on tag 340 that is a third variation of the fourth embodiment of the present invention, FIG. 25 is a sectional view taken along line XI—XI in FIG. 24, and FIG. 26 is a plan view showing how the sales promotion label for use on tag 340 is used and how a price is changed. The sales promotion label for use on tag 340 has a backing sheet 302 and a label body 303. The label body 303 is formed with a advertising mark display region 305, modified price display region 306, advertisement display region 321, and, in addition, a first backing region 341 and second backing region 342, which are similar to the backing region 322.

The first backing region 341 and second backing region 342 are congruent with the advertisement display region 321 and modified price display region 306, respectively, can be attached to the respective rear surfaces thereof by folding at the portion of a folding perforation 325.

Like the earlier described sales promotion label for use on tag 301 (FIG. 15), sales promotion label for use on tag 320 (FIG. 18) and sales promotion label for use on tag 330 (FIG. 24), the sales promotion label for use on tag 340 of this configuration can also contribute to merchandise sales promotion by enabling simple display of various sales promotion information. Moreover, since only the mark display region 305 need be stuck on the tag 307, the sticking operation (attachment operation) is itself simple and the sales promotion information can be displayed to better effect because the regions projecting outside the region of the tag 307 are the modified current price display region 306 and advertisement display region 321.

It should be noted that in the present invention it is possible in regions other than the mark display region 305 containing the modification mark 309, namely, in the modified current price display region 306, advertisement display region 321 and barcode display region 331, to display not only the exemplified sales promotion information but also desired sales promotion information, starting with the merchandise modified current sales price 310 but also including advertising information 324 consisting of various advertising characters, e.g., "Bargain Price Today!," or barcode information 332. For instance, the modified current sales price 310 can be displayed inside the delineating frame 323 of the advertisement display region 321.

Further, although paired regions, such the advertisement display region 321 and backing region 322 (FIGS. 18 and 21), the first backing region 341 and second backing region 342, and the advertisement display region 321 and modified current price display region 306 (FIG. 24), must be adjacent to each other and positioned at the end portion of the label body 303, the positional relationship among the regions 305, 306, 321 and 331 is arbitrary.

As explained in the foregoing, since the present invention provides a mark display region Illustrated as an advertisement region having a modification mark and a modified current price display region capable displaying a modified current sales price and the like, the work of modifying the price and the work of displaying the modified current sales price can be carried out simultaneously, making workability excellent. Moreover, the appearance is good, which contributes to sales promotion by heightening purchaser desire to purchase.

Summarizing the Third Embodiment

To provide a sales promotion label for use on tag and a method of changing a price using the same that improve work efficiency in a shop by enabling price change, i.e., the operation of striking out a displayed price and the operation of displaying a changed price, to be conducted at one time, and improve merchandise sales promotion effect by indicating price reduction and sales promotion information.

Focusing on constituting a label body 303 from a transparent base material and attaching a label printed beforehand with a modification mark 309, a label body 303 constituted from a transparent base material has a mark display region 305 displaying a cancel indication mark as modification mark 309 indicating that a price has been changed and a modified current price display region 306 capable of displaying a modified current sales price 310 of the merchandise, and can be attached to the tag with the modified current price display region 306 overlaid on the price 308 displayed on the tag.

The present invention was accomplished in light of the foregoing problems and has as its object to provide a sales promotion label for use on tag that enables a price change to be made easily and so as to be pleasing to the eye, and a method of changing a price using the same.

Another object of the present invention is to provide a sales promotion label for use on tag that offers improved work efficiency in the shop by enabling price change, i.e., the operation of striking out a displayed price and the operation of displaying a changed price, to be conducted at one time, and a method of changing a price using the same.

Another object of the present invention is to provide a sales promotion label for use on tag that can enhance merchandise sales promotion effect by indicating price reduction and sales promotion information, and a method of changing a price using the same.

Another object of the present invention is to provide a sales promotion label for use on tag that can conspicuously indicate various information capable of promoting sales of merchandise.

Another object of the present invention is to provide a sales promotion label for use on tag that can heighten purchaser desire to purchase through a visual effect produced by displaying various information of appealing appearance capable of promoting merchandise sales, and a method of changing a price using the same.

Specifically, the present invention focuses on constituting a label body from a transparent base material, indicating strikeout of a price displayed on a tag not by handwriting but by attaching a label printed beforehand with a modification mark, and providing a modified current price display region on this label. In a first aspect, the present invention provides a sales promotion label for use on tag to promote sales of merchandise attached with a tag displaying a price of the merchandise, which sales promotion label for use on tag is characterized in comprising a label body attachable to the tag and constituted from a transparent base material, the label body having a advertising mark display region for displaying a modification mark indicating that the price of the merchandise has been changed and a modified current price display region capable of displaying a modified current sales price of the merchandise, the mark display region being attachable to the tag as overlaid on the price displayed on the tag.

In a second aspect, the present invention provides a method of changing a price using a sales promotion label for use on tag to promote sales of merchandise attached with a tag displaying a price of the merchandise, which method of changing a price using a sales promotion label for use on tag is characterized in comprising: forming a label body of the sales promotion label for use on tag that is attachable to the tag and constituted from a transparent base material with a mark display region for displaying a modification mark indicating that the price of the merchandise has been changed and a modified price display region capable of displaying a modified price of the merchandise, and, once the modified price has been displayed on the modified price display region, attaching the sales promotion label for use on tag to the tag with the mark display region overlaid on the price displayed on the tag.

The modified current price display region can be printed in a ground color different from a ground color of a surface of the tag.

The modified price display region can be disposed at higher tier than the mark display region.

The modified price display region can be disposed at a lower tier than the mark display region.

The label body can be provided with a backing region congruent with the modified price display region, which backing region can be folded at a boundary line portion between the backing region and the modified current price display region and attached to the rear surface side of the modified current price display region.

A folding perforation can be formed at the boundary line portion between the modified price display region and the backing region.

As means for attaching the sales promotion label for use on tag to the tag there can be adopted a configuration provided with an adhesive layer on the rear surface of the label body to enable attachment to the tag, means employing a stapler or other fastener, or any other desired means.

In the sales promotion label for use on tag and the method of changing a price using the same according to the present invention, strikeout of a price displayed on the tag is conducted not by handwriting but by providing the label body with a mark display region on which a modification mark indicating that the price of the merchandise has been changed is displayed by printing or the like and a modified current price display region capable of displaying the changed price of the merchandise.

After a modified price or the like has been displayed on the modified current price display region with an appropriate printer or the like, then, by attaching the mark display region to overlay the old price on the tag, it is possible, via the intervening transparent label body, to display that the price on the tag has been struck out by the modification mark of the mark display region, and also to display the modified price or the like by means of the modified price display region, so that the work of changing the price and the work of displaying the modified current sales price can be conducted simultaneously.

Workability in a shop where merchandise is on display is therefore excellent, and since the modification mark etc. can be displayed beforehand by means of a printer or the like, sales promotion effect can be enhanced by projecting a good appearance and an appealing image. Moreover, the price reduction of the sales-promoted merchandise can be impressed on the customer still more strongly by printing the modification mark in an eye-catching color.

Of particular note regarding the first aspect of the present invention is that since the mark display region and modified price display region are provided on the label body, the aforesaid work of changing the price and work of displaying the changed price can be done simultaneously, and when attaching the sales promotion label for use on tag, the preparatory work is simple because all that is required is to print the modified current sales price on the modified current price display region using an appropriate printer or the like.

Of particular note regarding the second aspect of the present invention is that a price change method offering good workability can be realized because merely by superimposing the mark display region on the old tag price, it is possible for the mark display region to display to the effect that the old price has been canceled and to display a modified price and/or the like at the same time as indicating the price-reduction of the sales-promoted merchandise.

The reference numerals denote the following:

FIRST EMBODIMENT

110 Label
111 Continuous label
112 Continuous backing strip
113 Continuous label
114 Tag
115 Promotional label
116 Label base material
117 Promotional label
118 Promotional slogan
119 Promotional label
120 a price indication region
121 original sales price
122 Bar-code corresponding to the current sales price 123 current sales price
124 Preforation line
125 An advertisement region 126 Strikeout mark
128 Print area 130 Colored advertisement region for a promotional slogan 118
132 Frame
134 Colored printing area for indicating current sales price 123
136 Advertisement region for indicating normal sales price 121
138 Advertisement region for indicating promotional slogan 118

SECOND EMBODIMENT

201 Sales promotion label for use on tag (second embodiment, FIG. 6)
202 Backing sheet
203 Label body
204 Adhesive layer
205 Advertising Mark display region (previous price modification region)
206 Modified current price display region
207 Advertisement display region
208 First backing region
209 Second backing region
210 Tag (FIGS. 8, 11 and 14)
211 Original sales price of merchandise (e.g., Yen 3900)
212 Modification mark
213 Modified current sales price of merchandise (e.g., Yen 3000)
214 Delineating frame of advertisement display region 207
215 Advertising information (various advertising characters, e.g. "Bargain Price Today!")
216 Folding perforation
220 Sales promotion label for use on tag (variation of the second embodiment, FIG. 9)
221 Backing region
230 Sales promotion label for use on tag (second variation of the second embodiment, FIG. 12)
231 Barcode display region
232 Barcode information

THIRD EMBODIMENT

301 Sales promotion label for use on tag (third embodiment, FIG. 15)
302 Backing sheet
303 Label body
304 Adhesive layer
305 Advertising Mark display region (original price modification region)
306 Modified current price display region
307 Tag 307 (FIGS. 16, 19 and 22)
308 Original sales price of merchandise (e.g., Yen 3900)
309 Modification mark
310 Modified current sales price of merchandise (e.g., 3000)
320 Sales promotion label for use on tag (third embodiment, FIG. 17)
321 Advertisement display region
322 Backing region
323 Delineating frame of advertisement display region 321
324 Advertising information (various advertising characters, e.g. "Bargain Price Today!")
325 Folding perforation
330 Sales promotion label for use on tag (third embodiment, FIG. 20)
331 Barcode display region
332 Barcode information
340 Sales promotion label for use on tag (third variation of the third embodiment, FIG. 24)
341 First backing region
342 Second backing region

The invention claimed is:

1. Price indication label comprising an attachable at least partially transparent label body which has a price indication region capable of indicating a current price and an advertisement region capable of advertising information for sales promotion, surface material of the price indication region and surface material of the advertisement region being different from each other, wherein at least a part of the surface material of the advertisement region comprises a see through material for enabling reading of printed information provided on a surface of a separate tag that the label is attached to.

2. Price indication label as in claim 1, wherein at least one of the surface materials of the price indication region and the advertisement region comprises a different colored ink than the other one of the regions.

3. Price indication label as in claim 1, wherein at least one of the surface materials of the price indication region and the advertisement region comprises a thermo sensitive multi color fixing agent.

4. Price indication label as in claim 1, wherein the see through material has a cancel indication mark for blocking a portion of the printed information viewable through the see through material when attached to a tag.

5. Price indication label as in claim 1, comprising a layer of adhesive material at a back surface of the label at least corresponding to the price indication region.

6. Price indication label as in claim 5, wherein at least a part of the advertisement region is capable of being folded towards the back surface of the label to glue a folded part to the back surface so as to be unattached.

7. Price indication label as in claim 6, including a fold line having perforations for enabling folding of the folded part.

8. Method for indicating a current price by providing a price indication label comprising an attachable at least partially transparent label body which has a price indication region capable of indicating a current price and an advertisement region capable of advertising information for sales promotion, the current price being indicated by using a different color from colors of the advertisement region, wherein at least a part of the label body in the advertisement region comprises a see through material for enabling viewing of printed information provided on a surface of a separate tag, and attaching the label to the tag allowing viewing of printed information therethrough.

9. Method as in claim 8, wherein the current price is indicated by using the surface color of the price indication region.

10. Method for applying a price indication label to a separate merchandise tag, the price indication label comprising an attachable at least partially transparent label body which has a price indication region capable of indicating a current price, a slogan advertisement region capable of advertising information for sales promotion, and a transparent advertisement region enabling viewing of printed information therethrough provided on a surface of the merchandise tag, the price indication label comprising a layer of adhesive material provided on a back surface corresponding to the price indication region and including the steps of:

aligning the transparent advertisement region with printed information on the merchandise tag; and attaching the label body of the price indication label to the surface of the merchandise tag so as to enable at least some of the printed information on the surface of the merchandise tag to be viewable through the transparent advertisement region of the price indication label.

11. The method for applying a label to a merchandise tag as in claim 10, including providing a cancellation mark in the transparent advertisement region, wherein the step of aligning the transparent advertisement region comprises canceling out with the cancellation mark a portion of a displayed price on the merchandise tag that is viewable through the transparent advertisement region.

12. The method for applying a label to a merchandise tag as in claim 11, including the step of peeling the label from a backing sheet before aligning the transparent advertisement region with a displayed price on the merchandise tag.

13. The method for applying a label to a merchandise tag as in claim 10, including the step of peeling the label from a backing sheet before aligning the transparent advertisement region with a displayed price on the merchandise tag.

14. Method for indicating a current price by applying a price indication label comprising an attachable label body which has a price indication region capable of indicating a current price and an advertisement region capable of advertising information for sales promotion to a tag, and folding a part of the advertisement region along a fold line toward a back surface of the label body in order to glue to the back surface.

15. A price indication label for applying to a merchandise tag comprising:

a backing sheet;

an adhesive layer positioned on a face of said backing sheet;

a transparent label body with first and second opposing faces, the first face of said label body contacting said adhesive layer so that said adhesive layer is located between said backing sheet and said label body;

a previous price modification display region comprising a first portion of said second face of said label body, and including a modification mark at the second face;

a current price display region comprising a second portion of said second face of said label body, the current price display region including a price value at the second face; and an advertisement display region comprising a third portion of said second face of said label body, said advertising display region including advertising characters at the third portion of said second face;

wherein the first portion of said second face of said transparent label body permits viewing of a merchandise tag price on a separate merchandise tag aligned with the first portion, except for the modification mark that is superimposed over the merchandise tag price.

16. The price indication label as in claim 15, said label further including:

a backing region comprising a fourth portion of said second face of said label body, wherein the backing region is folded when the label is secured to a tag so that the backing region provides a back support for one of the first through third portions that projects outwardly from an edge of a tag when the label is secured to a tag.

17. The price indication label as in claim 15, wherein the modification mark comprises a check mark, double-line strikeout mark or crisscross on the first portion of said label body.

18. The price indication label as in claim 15, wherein said advertisement display region comprises a delineating frame, and inside the delineating frame, a desired ground color that contrasts with the color of the frame and the color of the advertising characters.

19. The price indication label as in claim 15, said label further comprising a barcode display region comprising a fourth portion of said second face of said label body, said barcode display region displaying barcode information thereon.

* * * * *